US012809382B2

(12) United States Patent
Lee

(10) Patent No.: US 12,809,382 B2
(45) Date of Patent: Nov. 24, 2026

(54) UNMANNED AERIAL VEHICLE CONTROL DEVICE AND METHOD BASED ON SUPERIMPOSED IMAGERY

(71) Applicant: Sony Group Corporation, Tokyo (JP)

(72) Inventor: Shun Lee, Tokyo (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/615,097

(22) PCT Filed: Jun. 15, 2020

(86) PCT No.: PCT/JP2020/023352
§ 371 (c)(1),
(2) Date: Nov. 30, 2021

(87) PCT Pub. No.: WO2020/262060
PCT Pub. Date: Dec. 30, 2020

(65) Prior Publication Data

US 2022/0221879 A1 Jul. 14, 2022

(30) Foreign Application Priority Data

Jun. 27, 2019 (JP) ................................ 2019-119964

(51) Int. Cl.
*G05D 1/00* (2024.01)
*B64D 45/08* (2006.01)
(Continued)

(52) U.S. Cl.
CPC ............ *G05D 1/106* (2019.05); *B64D 45/08* (2013.01); *B64U 10/14* (2023.01);
(Continued)

(58) Field of Classification Search
CPC ...... G05D 1/106; B64C 39/024; B64D 45/08; B64U 10/13; B64U 2201/10; B64U 10/14; B64U 2201/20; B64U 2101/30
See application file for complete search history.

(56) References Cited

U.S. PATENT DOCUMENTS 9,043,043 B1 * 5/2015 Gribble ................ G05D 1/0676 701/16
9,141,113 B1 * 9/2015 Ivanov .................... G01S 17/89
(Continued)

FOREIGN PATENT DOCUMENTS

CN 107444665 A 12/2017
CN 107943090 A 4/2018
(Continued)

OTHER PUBLICATIONS

International Search Report and Written Opinion mailed on Sep. 1, 2020, received for PCT Application PCT/JP2020/023352, Filed on Jun. 15, 2020, 9 pages including English Translation.

*Primary Examiner* — Erin D Bishop
*Assistant Examiner* — Karen Lynelle Furgason
(74) *Attorney, Agent, or Firm* — XSENSUS LLP

(57) ABSTRACT

A safety degree calculation unit calculates a safety degree of a flat surface existing in an external environment on the basis of flat surface information regarding the flat surface, and a movement control unit controls movement to the flat surface on the basis of the calculated safety degree. The technology according to the present disclosure can be applied to, for example, a moving body such as a drone.

16 Claims, 21 Drawing Sheets

(51) Int. Cl.
*B64U 10/14* (2023.01)
*B64U 101/30* (2023.01)

(52) U.S. Cl.
CPC ...... *B64U 2101/30* (2023.01); *B64U 2201/10* (2023.01); *B64U 2201/20* (2023.01)

(56) References Cited

U.S. PATENT DOCUMENTS

| | | | | |
|---|---|---|---|---|
| 2013/0179011 | A1* | 7/2013 | Colby | G05D 1/105 701/16 |
| 2015/0134384 | A1* | 5/2015 | Heinonen | G06Q 10/0631 705/7.12 |
| 2015/0170526 | A1* | 6/2015 | Wang | G08G 5/54 701/16 |
| 2015/0326932 | A1* | 11/2015 | Hill | H04N 21/4312 725/32 |
| 2016/0114905 | A1 | 4/2016 | Derenick | |
| 2016/0137309 | A1* | 5/2016 | Abernathy | G08G 5/74 340/947 |
| 2017/0075359 | A1* | 3/2017 | Wang | G01C 21/1656 |
| 2017/0168507 | A1* | 6/2017 | Paduano | G06Q 50/28 |
| 2017/0307746 | A1* | 10/2017 | Rohani | G01S 13/865 |
| 2017/0308099 | A1 | 10/2017 | Kim et al. | |
| 2017/0344000 | A1* | 11/2017 | Krishnamoorthy | B64F 1/362 |
| 2018/0068419 | A1* | 3/2018 | Takeda | G06T 5/002 |
| 2018/0101173 | A1* | 4/2018 | Banerjee | G05D 1/0684 |
| 2018/0114450 | A1* | 4/2018 | Glaab | G08G 5/0069 |
| 2019/0087635 | A1* | 3/2019 | Klaus | H04N 13/239 |
| 2019/0163206 | A1 | 5/2019 | Zhu | |
| 2020/0265731 | A1* | 8/2020 | Lev | G08G 5/0013 |
| 2020/0365041 | A1* | 11/2020 | Kasilya Sudarsan | G08G 5/025 |

FOREIGN PATENT DOCUMENTS

| | | | |
|---|---|---|---|
| CN | 109472526 | A | 3/2019 |
| CN | 109562844 | A | 4/2019 |
| DE | 102015015988 | A | 6/2017 |
| JP | 2001-328600 | A | 11/2001 |
| JP | 2007-41656 | A | 2/2007 |
| JP | 2007-323119 | A | 12/2007 |
| JP | 2010134499 | A | 6/2010 |
| JP | 2015522458 | A | 8/2015 |
| WO | WO-2010071502 | A1 | 6/2010 |
| WO | WO-2018027338 | A1 | 2/2018 |
| WO | 2018/110088 | A1 | 6/2018 |
| WO | WO-2020262060 | A1 | 12/2020 |

* cited by examiner

FIG. 8

| | INCLINATION OF FLAT SURFACE (°) | SIZE OF REGION ($m^2$) | FLAT SURFACE STATE |
|---|---|---|---|
| FLAT SURFACE A | 1. 2 | 6. 0 | CONCRETE |
| FLAT SURFACE B | 5. 0 | 4. 5 | GRAVEL |
| FLAT SURFACE C | 12. 0 | 2. 0 | TURF |
| FLAT SURFACE D | 3. 5 | 0. 9 | CONCRETE |
| FLAT SURFACE E | 2. 3 | 3. 7 | GRAVEL |

FIG. 13

| | INCLINATION OF FLAT SURFACE (°) | SIZE OF REGION ($m^2$) | FLAT SURFACE STATE | PRESENCE/ABSENCE OF APPROACHING OBJECT |
|---|---|---|---|---|
| FLAT SURFACE A | 1. 2 | 6. 0 | CONCRETE | NONE |
| FLAT SURFACE B | 5. 0 | 4. 5 | GRAVEL | TWO TREES |
| FLAT SURFACE C | 12. 0 | 2. 0 | TURF | NONE |
| FLAT SURFACE D | 3. 5 | 0. 9 | CONCRETE | TWO CARS |
| FLAT SURFACE E | 2. 3 | 3. 7 | GRAVEL | THREE BICYCLES |

FIG. 15

| | INCLINATION OF FLAT SURFACE (°) | SIZE OF REGION ($m^2$) | STOP STABILITY RATE | IN-REGION STOP PROBABILITY | STOP SUCCESS RATE |
|---|---|---|---|---|---|
| FLAT SURFACE A | 1. 2 | 6. 0 | 99% | 99% | 99% |
| FLAT SURFACE B | 5. 0 | 4. 5 | 98% | 80% | 78. 4% |
| FLAT SURFACE C | 12. 0 | 2. 0 | 90% | 20% | 18% |
| FLAT SURFACE D | 3. 5 | 0. 9 | 99% | 15% | 14. 85% |
| FLAT SURFACE E | 2. 3 | 3. 7 | 99% | 60% | 59. 4% |

UNMANNED AERIAL VEHICLE CONTROL DEVICE AND METHOD BASED ON SUPERIMPOSED IMAGERY

CROSS-REFERENCE TO RELATED APPLICATIONS

The present application is based on PCT filing PCT/JP2020/023352, filed Jun. 15, 2020, which claims priority to JP 2019-119964, filed Jun. 27, 2019, the entire contents of each are incorporated herein by reference.

TECHNICAL FIELD

The present disclosure relates to a moving body, a control method, and a program, and more particularly, to a moving body, a control method, and a program that enable a safer stop.

BACKGROUND ART

Conventionally, there is a moving body equipped with a sensor for observing an external environment in order to autonomously move without colliding with an obstacle or the like in the external environment. The moving bodies also include equipment that moves coupled with the moving bodies, or the like, as well as autonomous moving robots such as drones, vehicles, vessels, and vacuum cleaners that move autonomously. As the sensor, for example, a camera, a sonar, a radar, light detection and ranging or laser imaging detection and ranging (LiDER), or the like is mainly used.

Under such circumstances, Patent Document 1 discloses a technology in which a landing point search device that searches for a landing point of a flight body locates a landing point by evaluating a ground surface state of a candidate landing point on the basis of distance information on the ground surface obtained from a stereo camera image.

CITATION LIST

Patent Document

Patent Document 1: Japanese Patent Application Laid-Open No. 2001-328600

SUMMARY OF THE INVENTION

Problems to be Solved by the Invention

A moving body that autonomously moves needs to stop safely in order to prevent a failure of the moving body. However, there is a possibility that the moving body stops at a place that is not suited for making a stop, such as a place where the ground is inclined.

The present disclosure has been made in view of such a situation and is intended to enable a safer stop.

Solutions to Problems

A moving body of the present disclosure is a moving body including: a safety degree calculation unit that calculates a safety degree of a flat surface existing in an external environment on the basis of flat surface information regarding the flat surface; and a movement control unit that controls movement to the flat surface on the basis of the calculated safety degree.

A communication method of the present disclosure is a control method performed by a moving body and including: calculating a safety degree of a flat surface existing in an external environment on the basis of flat surface information regarding the flat surface; and controlling movement to the flat surface on the basis of the calculated safety degree.

A program of the present disclosure is a program for causing a processor to execute processing including: calculating a safety degree of a flat surface existing in an external environment on the basis of flat surface information regarding the flat surface; and controlling movement to the flat surface on the basis of the calculated safety degree.

In the present disclosure, a safety degree of a flat surface existing in an external environment is calculated on the basis of flat surface information regarding the flat surface, and movement to the flat surface is controlled on the basis of the calculated safety degree.

BRIEF DESCRIPTION OF DRAWINGS

FIG. 8 is a diagram explaining the calculation of safety degrees of flat surfaces.

FIG. 13 is a diagram explaining the calculation of safety degrees of flat surfaces.

FIG. 15 is a diagram explaining the calculation of safety degrees of flat surfaces.

MODE FOR CARRYING OUT THE INVENTION

Modes for carrying out the present disclosure (hereinafter, referred to as embodiments) will be described below. Note that the description will be given in the following order.

1. Outline of Technology according to Present Disclosure
2. Configuration of Moving Body
3. First Embodiment (Calculation of Safety Degree of Flat Surface based on Flat Surface Map)
4. Second Embodiment (Calculation of Safety Degree of Flat Surface based on Flat Surface Map and External Environment Information)
5. Display of Superimposed Image and Specification of Stop Location

1. Outline of Technology According to Present Disclosure

Figure 1:
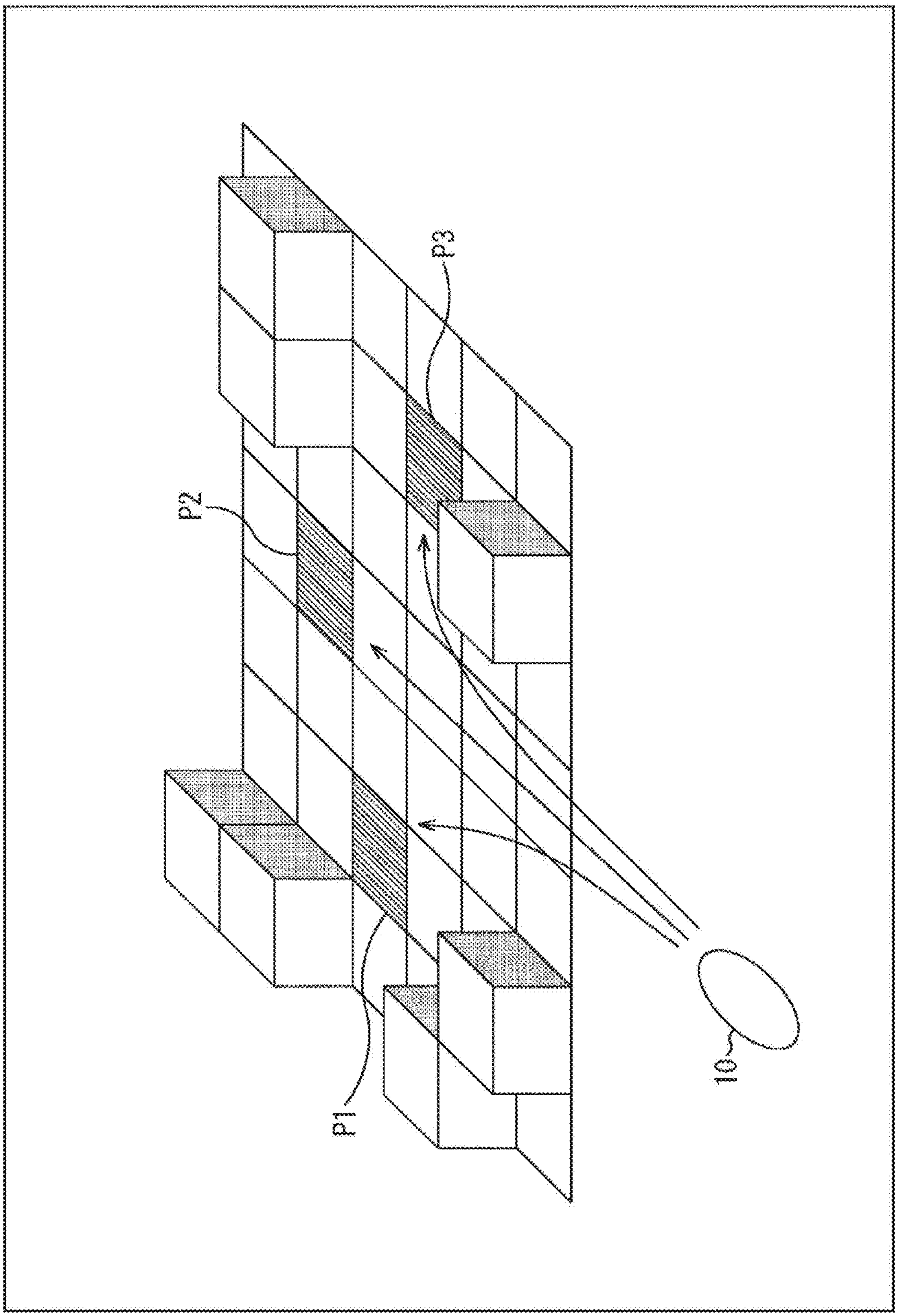
FIG. 1 is a diagram explaining a moving body to which a technology according to the present disclosure is applied.

A moving body 10 illustrated in FIG. 1 to which the technology according to the present disclosure is applied is configured to calculate a safety degree of a flat surface existing in an external environment in a moving space and control movement to the flat surface on the basis of the calculated safety degree. The safety degree serves as an index of safety after the moving body 10 stops on a flat surface and easiness when the moving body 10 stops on a flat surface.

Specifically, the moving body 10 detects flat surfaces P1, P2, and P3 in the external environment using sensor data acquired by a sensor (not illustrated). The moving body 10 calculates the safety degrees of the respective detected flat surfaces P1, P2, and P3 on the basis of flat surface information regarding the flat surfaces P1, P2, and P3.

Then, the moving body 10 moves to a flat surface having the highest safety degree among the respective calculated flat surfaces P1, P2, and P3 and stops on the flat surface.

The moving bodies also include equipment that moves coupled with the moving bodies, or the like, as well as autonomous moving robots such as drones, vehicles, vessels, and vacuum cleaners that move autonomously. In the following, an example in which the technology according to the present disclosure is mainly applied to a drone that flies in the air will be described. However, the technology according to the present disclosure can be applied to autonomous moving robots such as an autonomous traveling vehicle that moves on land, an autonomous navigation vessel that moves on water or under water, and an autonomous moving vacuum cleaner that moves indoors, apart from the drone.

2. Configuration of Moving Body

Figure 2:
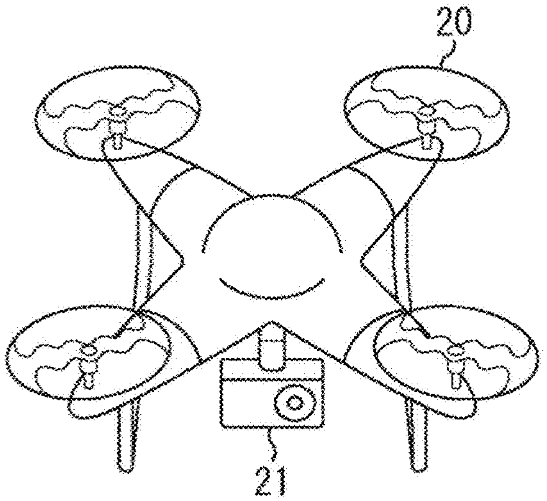
FIG. 2 is a view illustrating an appearance of the moving body.

FIG. 2 is a view illustrating an appearance of a moving body to which the technology according to the present disclosure (the present technology) is applied.

As described above, the moving body 20 illustrated in FIG. 2 is configured as a drone. The movement of the moving body 20 is thus movement by flight, but the movement of the moving body 20 is movement on land in a case where the moving body 20 is configured as an autonomous traveling vehicle, and the movement of the moving body 20 is movement on water or under water in a case where the moving body 20 is configured as an autonomous navigation vessel. Furthermore, in a case where the moving body is configured as an autonomous moving vacuum cleaner, the movement of the moving body 20 is movement indoors.

The moving body 20 is equipped with a sensor 21 for observing the external environment in order to autonomously move without colliding with an obstacle or the like in the external environment.

The sensor 21 only needs to be a sensor capable of acquiring a three-dimensional shape of the external environment and, for example, has a configuration including a sonar, a radar, LiDER, and the like, apart from a depth sensor such as a camera, a stereo camera, and a time-of-flight (ToF) sensor. Furthermore, the sensor 21 may have a configuration including a spectral sensor, a polarization sensor, or the like capable of acquiring the material and the degree of unevenness of the flat surface existing in the external environment. The sensor data collected by the sensor 21 is used, for example, to control the movement of the moving body 20.

The moving body 20 may be configured to move autonomously, or may be configured to move in accordance with a signal from a controller (not illustrated) for piloting the moving body 20, which is constituted by a transmitter, a personal computer (PC), or the like.

For example, a drone that autonomously flies needs to land safely in order to prevent a failure of the drone. However, there is a possibility that the drone lands on a place that is not suited for landing, such as a place where the ground is inclined. Furthermore, even in a case where a pilot manually flies the drone by operating the controller, the pilot needs to recognize a place suitable for landing.

Thus, the moving body 20 of the present technology is configured to detect a place suitable for making a stop (landing) using the sensor 21 equipped in the moving body 20 and move to a safer place.

(Configuration Blocks of Moving Body)

Figure 3:
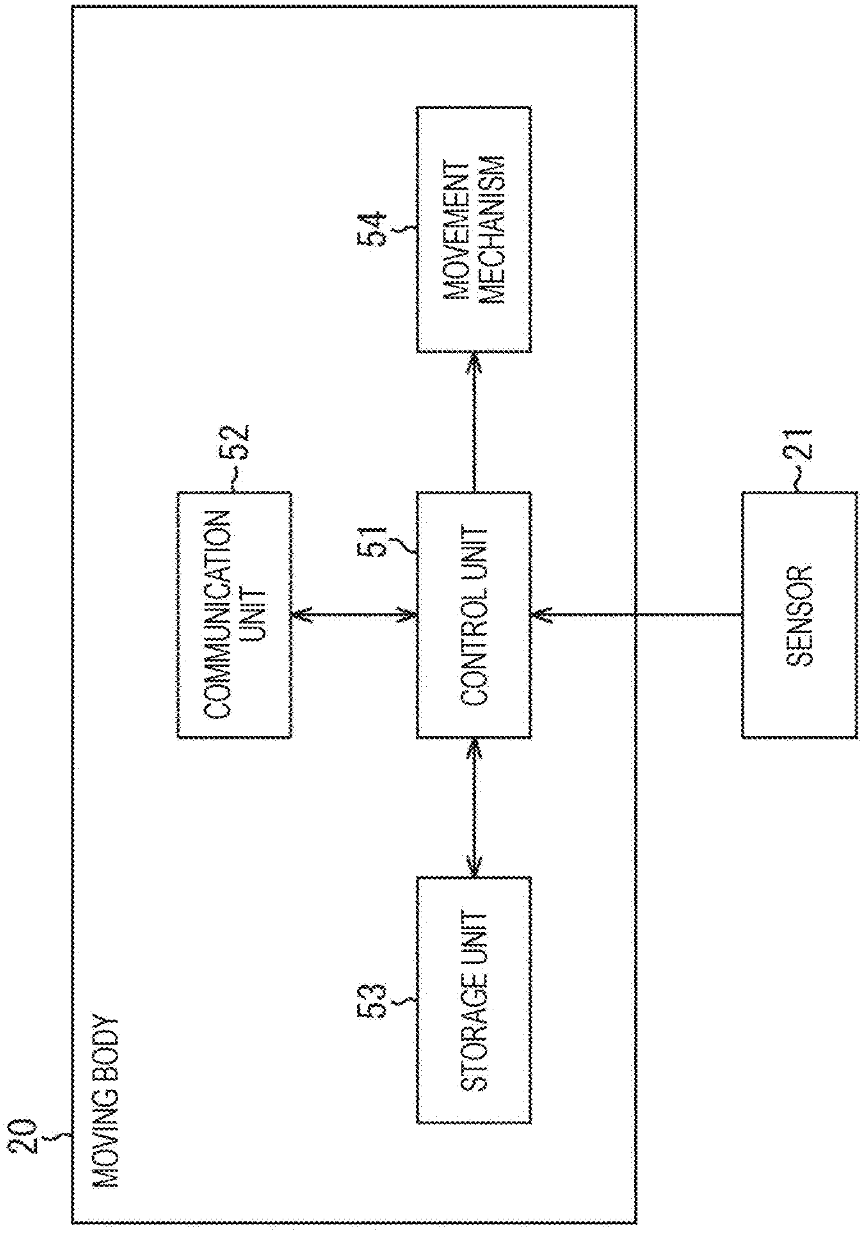
FIG. 3 is a block diagram illustrating an exemplary configuration of the moving body.

FIG. 3 is a block diagram illustrating an exemplary configuration of the moving body 20.

The moving body 20 includes a control unit 51, a communication unit 52, a storage unit 53, and a movement mechanism 54.

The control unit 51 is constituted by a processor such as a central processing unit (CPU), a memory, and the like and controls the communication unit 52, the storage unit 53, the movement mechanism 54, and the sensor 21 by executing a predetermined program. For example, the control unit 51 controls the movement mechanism 54 on the basis of the sensor data collected by the sensor 21.

The communication unit 52 is constituted by a network interface or the like and performs wireless or wired communication with a controller for piloting the moving body 20 or any other device. For example, the communication unit 52 may directly communicate with a device that is the communication partner, or may perform network communication via a base station or a repeater for Wi-Fi (registered trademark), 4G, 5G, or the like. Furthermore, the communication unit 52 receives global positioning system (GPS) information transmitted from a GPS satellite.

The storage unit 53 is constituted by, for example, a nonvolatile memory such as a flash memory and stores various types of information under the control of the control unit 51. For example, the storage unit 53 stores (holds) a flat surface map in which flat surface information regarding a flat surface detected in the external environment is mapped in a three-dimensional space.

The movement mechanism 54 is a mechanism for moving the moving body 20 and includes a flight mechanism, a traveling mechanism, a propulsion mechanism, and the like. In this example, the moving body 20 is configured as a drone, and the movement mechanism 54 is constituted by a motor, a propeller, and the like as a flight mechanism. Furthermore, in a case where the moving body 20 is configured as an autonomous traveling vehicle, the movement mechanism 54 is constituted by wheels and the like as a traveling mechanism, and in a case where the moving body 20 is configured as an autonomous navigation vessel, the movement mechanism 54 is constituted by a screw propeller and the like as a propulsion mechanism. The movement mechanism 54 is driven under the control of the control unit 51 to move the moving body 20.

3. First Embodiment (Function Configuration Blocks of Control Unit)

Figure 4:
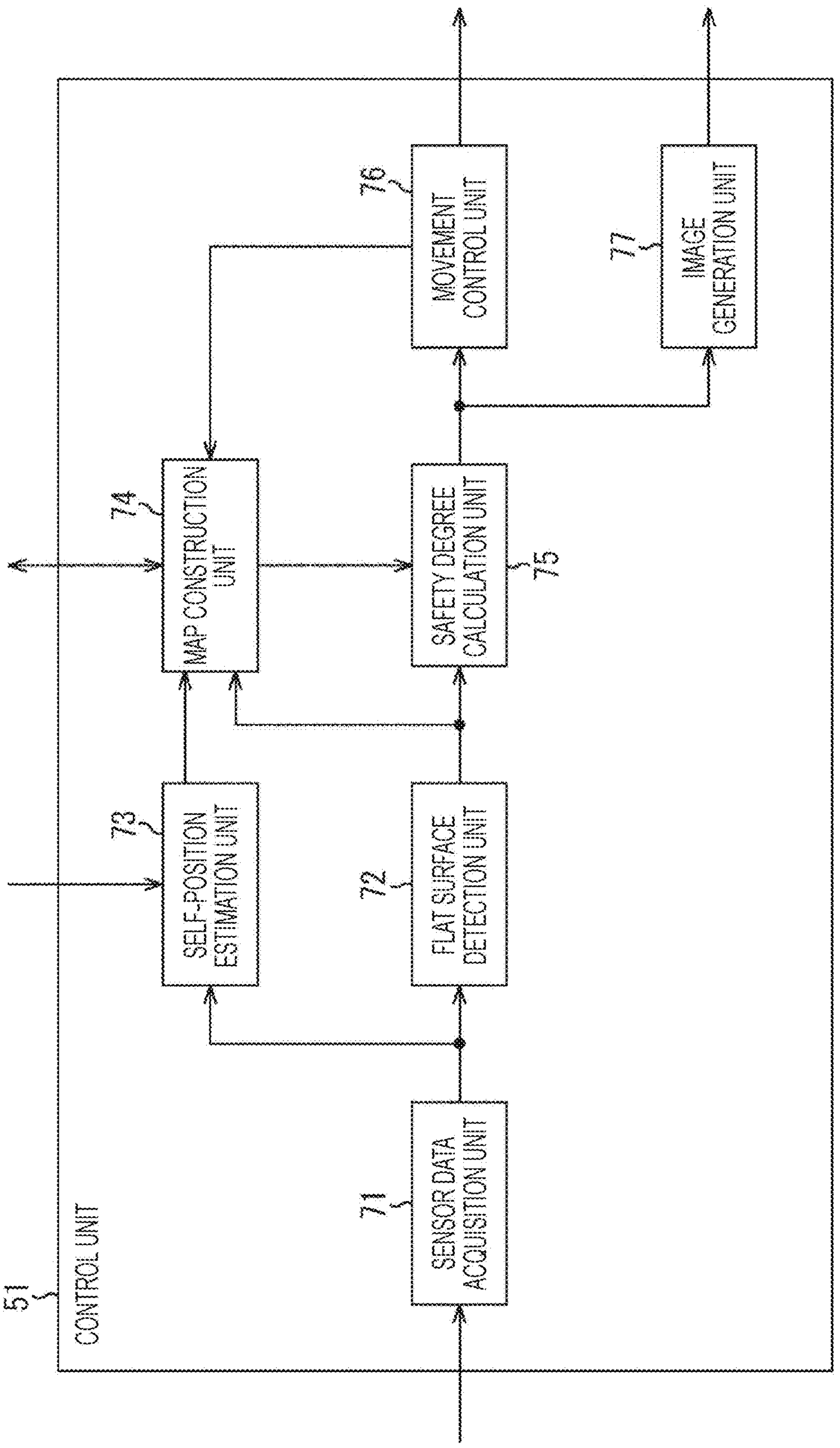
FIG. 4 is a block diagram illustrating an exemplary function configuration of a control unit.

FIG. 4 is a block diagram illustrating an exemplary function configuration of the control unit 51.

The function blocks of the control unit 51 illustrated in FIG. 4 are implemented by a processor that constitutes the control unit 51 executing a predetermined program.

The control unit 51 is constituted by a sensor data acquisition unit 71, a flat surface detection unit 72, a self-position estimation unit 73, a map construction unit 74, a safety degree calculation unit 75, a movement control unit 76, and an image generation unit 77.

The sensor data acquisition unit 71 acquires sensor data from the sensor 21 and supplies the acquired sensor data to the flat surface detection unit 72 and the self-position estimation unit 73.

The flat surface detection unit 72 detects a flat surface existing in the external environment (moving space) on the basis of the sensor data from the sensor data acquisition unit 71 and extracts flat surface information regarding the detected flat surface. The extracted flat surface information is supplied to the map construction unit 74 and the safety degree calculation unit 75.

The self-position estimation unit 73 estimates the position of the own body (moving body 20) on the basis of the GPS information received by the communication unit 52 and supplies position information representing the estimated position to the map construction unit 74. Furthermore, the self-position estimation unit 73 may estimate the position of the own body by simultaneous localization and mapping (SLAM) on the basis of the sensor data from the sensor data acquisition unit 71.

The map construction unit 74 constructs the flat surface map on the basis of the position information from the self-position estimation unit 73 and the flat surface information from the flat surface detection unit 72. The constructed flat surface map is supplied to the safety degree calculation unit 75.

Note that the flat surface map constructed in advance may be held in the storage unit 53 such that the flat surface map is read from the storage unit 53 and updated each time new sensor data is acquired by the sensor data acquisition unit 71. Furthermore, in addition to reading the flat surface map from the storage unit 53, the flat surface map constructed in advance may be read from an external device, a server on a network, or the like via the communication unit 52.

The safety degree calculation unit 75 calculates the safety degree of the flat surface for each flat surface corresponding to the flat surface information, on the basis of the flat surface map from the map construction unit 74 and the flat surface information from the flat surface detection unit 72. The calculated safety degree of each flat surface is supplied to the movement control unit 76 and the image generation unit 77.

The movement control unit 76 controls the movement of the moving body 20 to a flat surface on the basis of the safety degree from the safety degree calculation unit 75.

On the basis of the safety degree from the safety degree calculation unit 75, the image generation unit 77 generates a superimposed image to be superimposed on a captured image obtained by capturing the external environment at a position corresponding to each flat surface for which the safety degree has been calculated. The generated superimposed image is transmitted to a controller or the like on which the captured image obtained by capturing the external environment is displayed, via the communication unit 52.

(Flow of Movement Control Processing)

Figure 5:
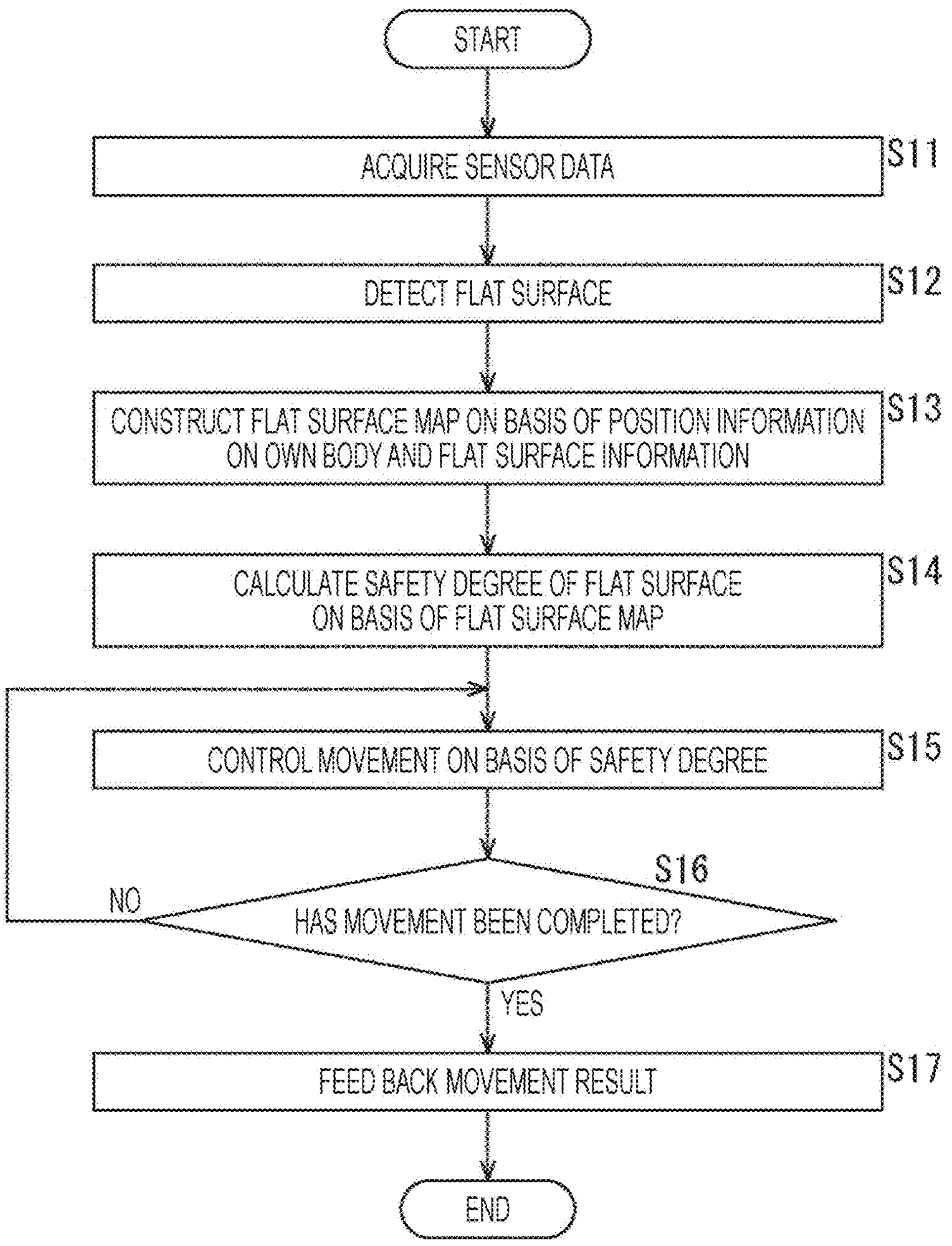
FIG. 5 is a flowchart explaining a flow of movement control processing.

Next, a flow of movement control processing for the moving body 20 will be described with reference to the flowchart in FIG. 5. The processing in FIG. 5 is executed, for example, before the moving body 20 stops (arrives) at a place that is the destination, after moving in accordance with a predefined route.

In step S11, the sensor data acquisition unit 71 acquires sensor data from the sensor 21.

In step S12, the flat surface detection unit 72 detects a flat surface existing in the external environment on the basis of the sensor data acquired by the sensor data acquisition unit 71.

Figure 6:
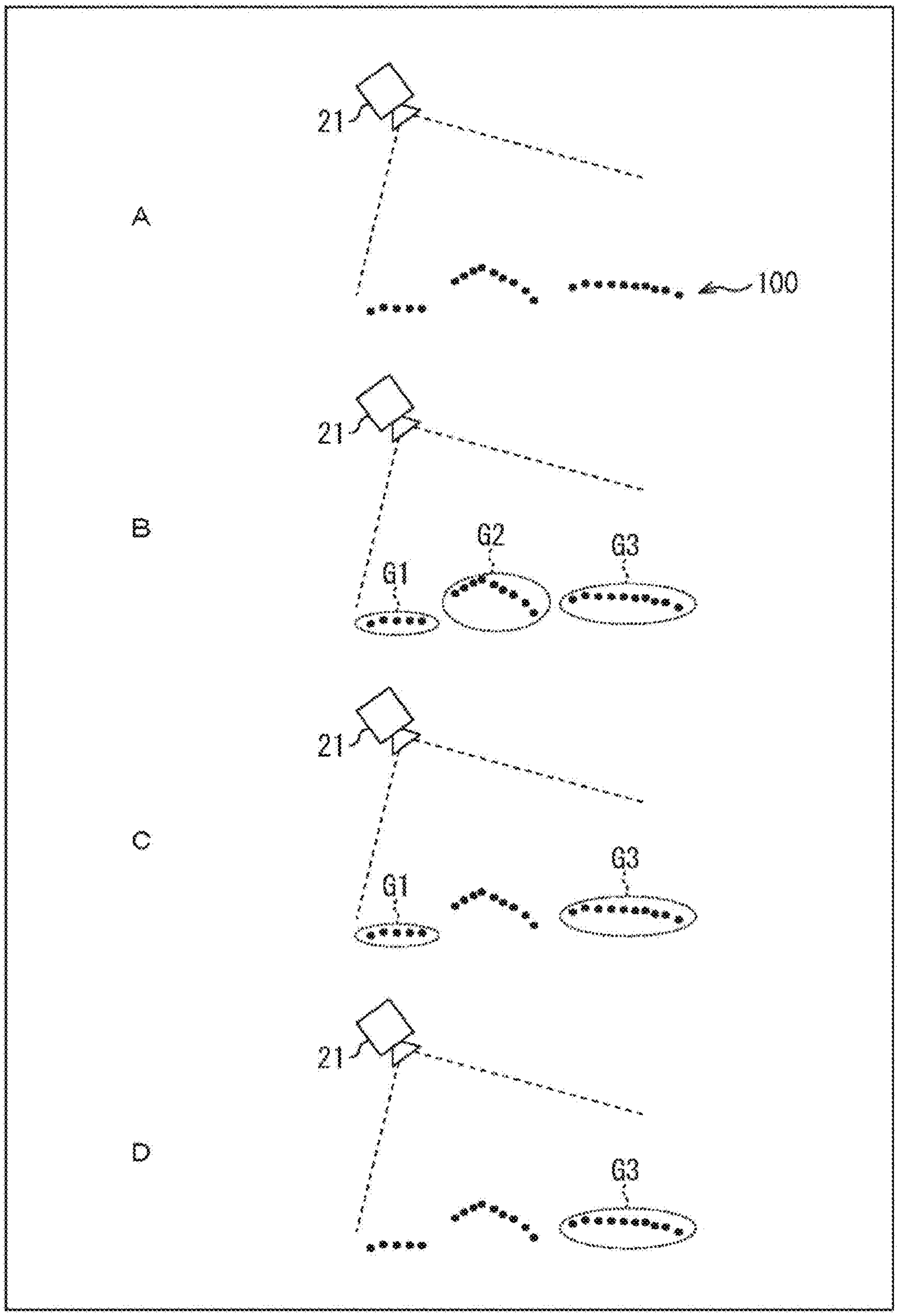
FIG. 6 is a diagram explaining an example of a flat surface detection method.

FIG. 6 is a diagram explaining an example of a flat surface detection method.

First, as illustrated in A of FIG. 6, the sensor data acquisition unit 71 acquires point cloud data 100 as depth data from a stereo camera or a ToF sensor constituting the sensor 21. The sensor 21 is configured as a stereo camera or a time-of-flight (ToF) sensor capable of acquiring a three-dimensional shape.

Next, the flat surface detection unit 72 groups the acquired point cloud data 100. For example, the point cloud data 100 is grouped on the basis of the position information and distance information on each point constituting the point cloud data 100. In B of FIG. 6, the point cloud data 100 is grouped into three point cloud data groups G1, G2, and G3.

Next, the flat surface detection unit 72 calculates a flatness of each of the point cloud data groups and designates a point cloud data group of which the calculated flatness exceeds a predetermined level, as a flat surface candidate. The flatness is assumed as a value representing the smoothness (uniformity) of a flat surface. In C of FIG. 6, the two point cloud data groups G1 and G3 are designated as flat surface candidates.

Then, the flat surface detection unit 72 calculates the size of the point cloud data group designated as the flat surface candidate and detects a point cloud data group of which the calculated size exceeds a predetermined size, as the flat surface. In D of FIG. 6, the point cloud data group G1 is detected as a flat surface.

A flat surface existing in the external environment is detected as described above, but the flat surface detection method is not restricted to the example in FIG. 6 and may be implemented by a predetermined flat surface detection algorithm using the sensor data acquired by the sensor data acquisition unit 71. Furthermore, a flat surface existing in the external environment may be detected by deep learning.

Figure 7:
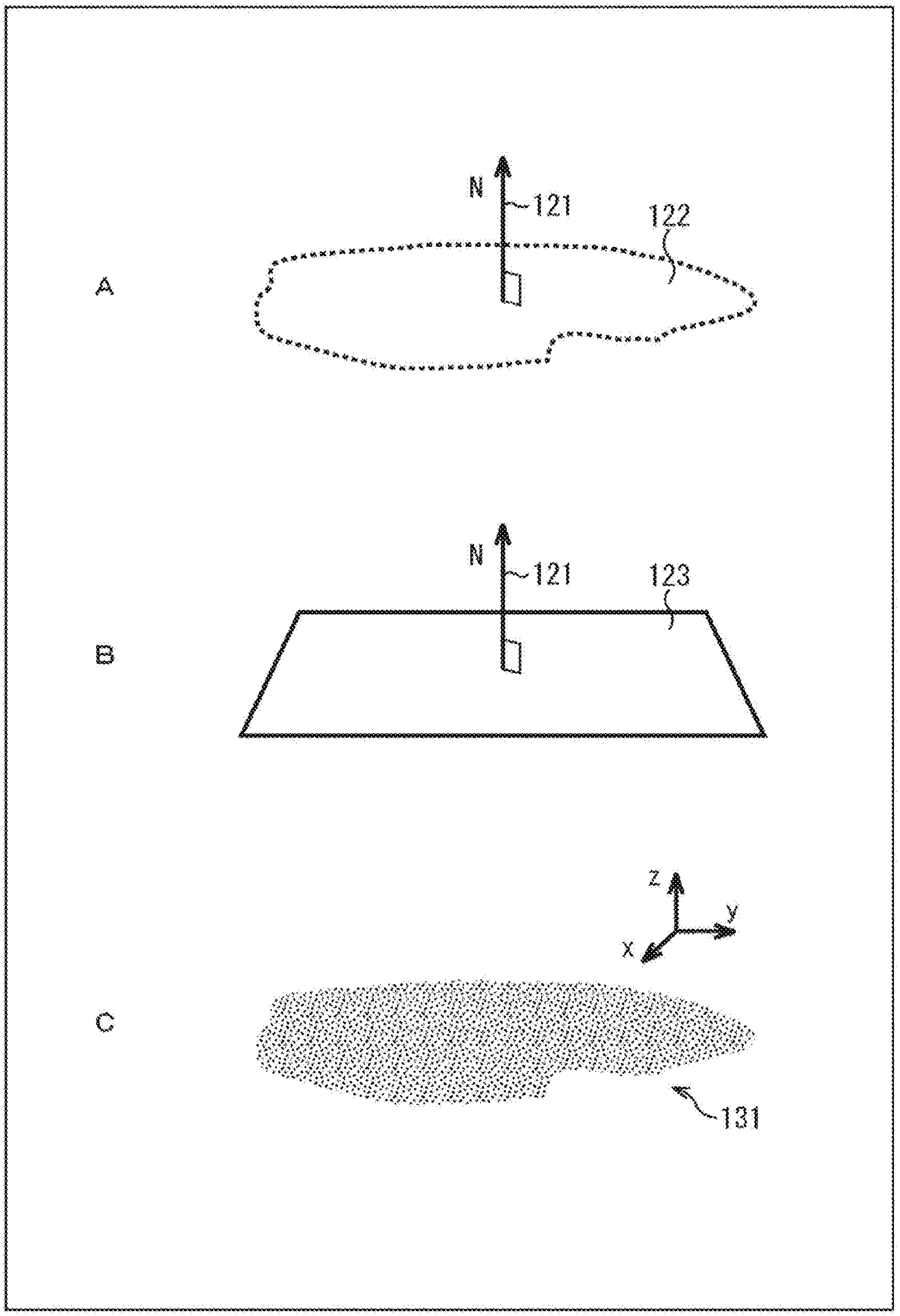
FIG. 7 is a diagram explaining an example of a flat surface detection result.

FIG. 7 is a diagram explaining an example of a flat surface detection result.

For example, as illustrated in A of FIG. 7, the detected flat surface is expressed by a normal vector 121, a two-dimensional flat surface region 122, and coordinates of the normal vector 121 and the two-dimensional flat surface region 122 on a world coordinate system. The shape of the two-dimensional flat surface region 122 corresponds to the shape of the point cloud data group described above.

Note that, as illustrated in B of FIG. 7, the detected flat surface may be expressed using an approximate two-dimensional flat surface region 123 instead of the two-dimensional flat surface region 122. The approximate two-dimensional flat surface region 123 is expressed by a rectangular flat surface approximating the two-dimensional flat surface region 122.

Moreover, as illustrated in C of FIG. 7, the detected flat surface may be expressed by a set 131 of respective points constituting the point cloud data group and coordinates of the points on the world coordinate system.

In this manner, the detected flat surface is expressed as a two-dimensional flat surface on the world coordinate system.

Then, the flat surface detection unit 72 extracts the position, size, and inclination of the flat surface worked out from the coordinates described above, as flat surface information regarding the detected flat surface. The inclination of the flat surface is an inclination with respect to a gravitational acceleration direction and can be calculated on the basis of sensor data from an acceleration sensor included in the moving body 20. Furthermore, in a case where the sensor 21 has a configuration including a spectral sensor or a polarization sensor, the flat surface information may include the material of the flat surface or the degree of unevenness of the flat surface.

Such flat surface information serves as an index for calculating the safety degree of each flat surface.

Subsequently, returning to the flowchart in FIG. 5, in step S13, the map construction unit 74 constructs the flat surface map on the basis of the position information representing the position of the own body estimated by the self-position estimation unit 73 and the flat surface information extracted by the flat surface detection unit 72.

In the flat surface map, the flat surface information is mapped to (associated with) the coordinates described with reference to FIG. 7 in the three-dimensional space on the world coordinate system, with the position information on the own body as a reference.

In step S14, the safety degree calculation unit 75 calculates the safety degree of the flat surface detected by the flat surface detection unit 72 on the basis of the flat surface map constructed by the map construction unit 74 and the flat surface information mapped to the flat surface map.

For example, the safety degree calculation unit 75 calculates the safety degree of the flat surface depending on how much its flat surface information mapped to the flat surface map satisfies a preset condition. Examples of the preset condition include (1) the inclination of the flat surface with respect to the gravitational acceleration direction is 5° or smaller, (2) the size of the flat surface is 1 $m^2$ or larger, and (3) the state of the flat surface is other than water or gravel.

For example, it is assumed that five flat surfaces A to E are detected by the flat surface detection unit 72.

As illustrated in FIG. 8, the flat surface A has an inclination of 1.2°, a size of 6.0 $m^2$, and a flat surface state of concrete. The flat surface B has an inclination of 5.0°, a size of 4.5 $m^2$, and a flat surface state of gravel. The flat surface C has an inclination of 12.0°, a size of 2.0 $m^2$, and a flat surface state of turf. The flat surface D has an inclination of 3.5°, a size of 0.9 $m^2$, and a flat surface state of concrete. The flat surface E has an inclination of 2.3°, a size of 3.7 $m^2$, and a flat surface state of gravel.

Here, among the above-described conditions (1) to (3), the flat surface A satisfies all three conditions, the flat surface B satisfies two conditions, the flat surface C satisfies two conditions, the flat surface D satisfies two conditions, and the flat surface E satisfies two conditions. Therefore, in this case, the safety degree of the flat surface A that satisfies all of the conditions (1) to (3) is calculated as the highest value.

Of course, depending on the set conditions, the safety degree of a flat surface other than the flat surface A also can be calculated as the highest value.

In step S15, the movement control unit 76 controls the movement of the moving body 20 to the flat surface on the basis of the safety degree calculated by the safety degree calculation unit 75. Specifically, the movement control unit 76 controls the movement mechanism 54 so as to move and stop the moving body 20 with the flat surface having the highest safety degree among the flat surfaces for which the safety degrees have been calculated, as the target for the stop position.

In step S16, it is determined whether or not the movement of the moving body 20 to the flat surface having the highest safety degree has been completed. For example, it is determined whether or not the moving body 20 configured as a drone has landed on the flat surface having the highest safety degree.

Until it is determined that the movement of the moving body 20 has been completed, the processing in step S15, that is, the control of the movement based on the safety degree is repeated. Then, for example, when it is determined that the moving body 20 configured as a drone has landed on the flat surface having the highest safety degree and the movement of the moving body 20 has been completed, the processing proceeds to step S17.

In step S17, the movement control unit 76 feeds back the result of movement to the flat surface, as the flat surface information. Specifically, the movement control unit 76 notifies the map construction unit 74 that the moving body 20 has safely stopped on the flat surface assigned as the target for the stop position. The map construction unit 74, for example, appends history information indicating that the moving body 20 has safely stopped on the flat surface assigned as the target for the stop position, to the constructed flat surface map as the flat surface information.

According to the above processing, since the safety degree of the flat surface existing in the external environment is calculated, and the movement to the flat surface is controlled on the basis of the calculated safety degree, the moving body 20 is allowed to stop more safely without stopping at a place that is not suited for making a stop.

In the above-described embodiment, the safety degree of the flat surface is assumed to be calculated on the basis only of the flat surface information regarding that flat surface. However, whether or not the flat surface is safe depends not only on the situation of the whole flat surface but also on the situation around the flat surface.

Thus, in the following, an embodiment will be described in which the safety degree of a flat surface is calculated on the basis of the flat surface information regarding the flat surface and external environment information regarding the external environment in which the flat surface exists.

4. Second Embodiment (Function Configuration Blocks of Control Unit)

Figure 9:
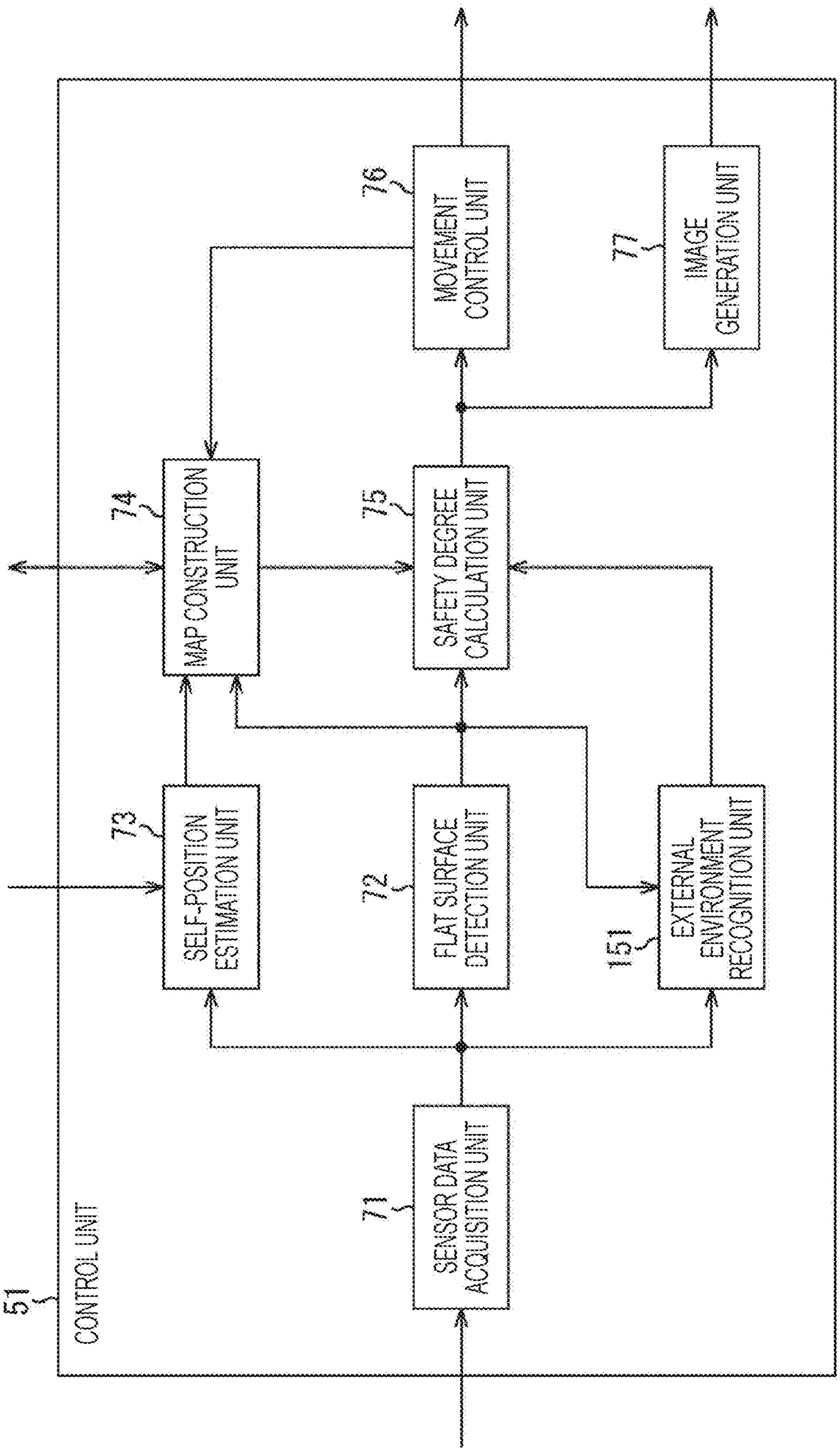
FIG. 9 is a block diagram illustrating another exemplary function configuration of the control unit.

FIG. 9 is a block diagram illustrating an exemplary function configuration of a control unit 51 according to the present embodiment.

The control unit 51 in FIG. 9 includes an external environment recognition unit 151 as well as a configuration similar to the configuration of the control unit 51 in FIG. 4.

The external environment recognition unit 151 acquires external environment information by recognizing the state of the external environment (moving space) on the basis of the sensor data from a sensor data acquisition unit 71. The external environment information includes, for example, information representing the presence or absence of an obstacle in the external environment and an attribute of a flat surface existing in the external environment (which of a road surface, a park square, an indoor floor surface, and the like the flat surface is). The acquired external environment information is supplied to a safety degree calculation unit 75.

(Flow of Movement Control Processing)

Next, a flow of movement control processing for a moving body 20 according to the present embodiment will be described with reference to the flowchart in FIG. 10.

Figure 10:
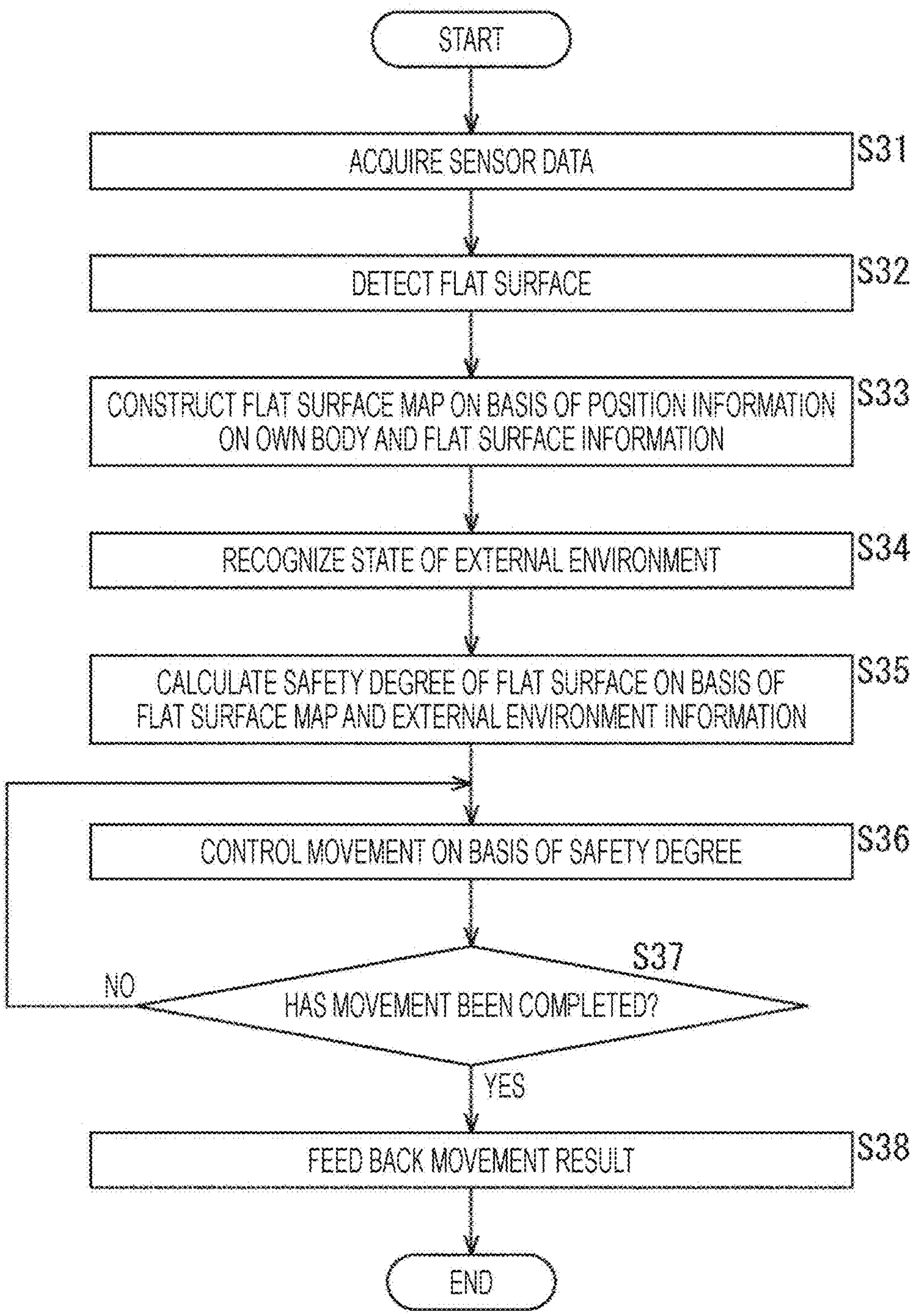
FIG. 10 is a flowchart explaining a flow of movement control processing.

Note that the processing in steps S31 to S33 and S36 to S38 in the flowchart in FIG. 10 are similar to the respective pieces of processing in steps S11 to S17 in the flowchart in FIG. 5, and thus the description thereof will be omitted.

That is, in step S34, the external environment recognition unit 151 recognizes the state of the external environment on the basis of the sensor data from the sensor data acquisition unit 71. Specifically, the external environment recognition unit 151 detects an obstacle (specifically, a dynamic object) in the external environment and verifies the attribute of a flat surface existing in the external environment.

Figure 11:
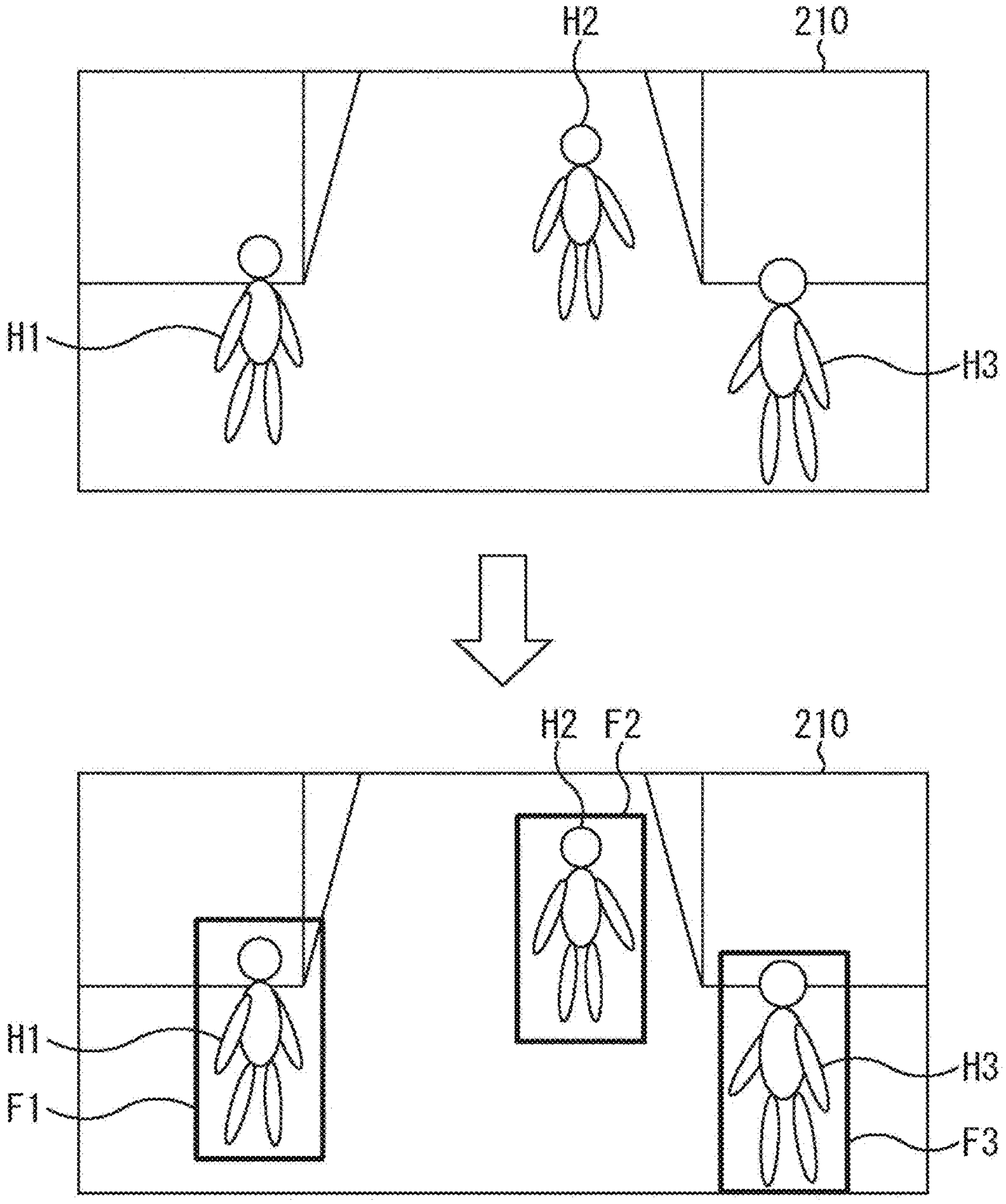
FIG. 11 is a diagram explaining the detection of dynamic objects.

For example, it is assumed that a captured image 210 as illustrated in the upper part of FIG. 11 is captured by the sensor data acquisition unit 71 configured as a camera. The captured image 210 shows three persons H1, H2, and H3.

As illustrated in the lower part of FIG. 11, the external environment recognition unit 151 performs person detection on the captured image 210. In the captured image 210 in the lower part of FIG. 11, a frame F1 indicating that the person H1 has been detected, a frame F2 indicating that the person H2 has been detected, and a frame F3 indicating that the person H3 has been detected are displayed superimposed.

In the example in FIG. 11, it is assumed that a person is detected as a dynamic object in the external environment, but an animal such as a dog or a cat, or another moving body (for example, a drone) may be detected in addition to the person.

Figure 12:
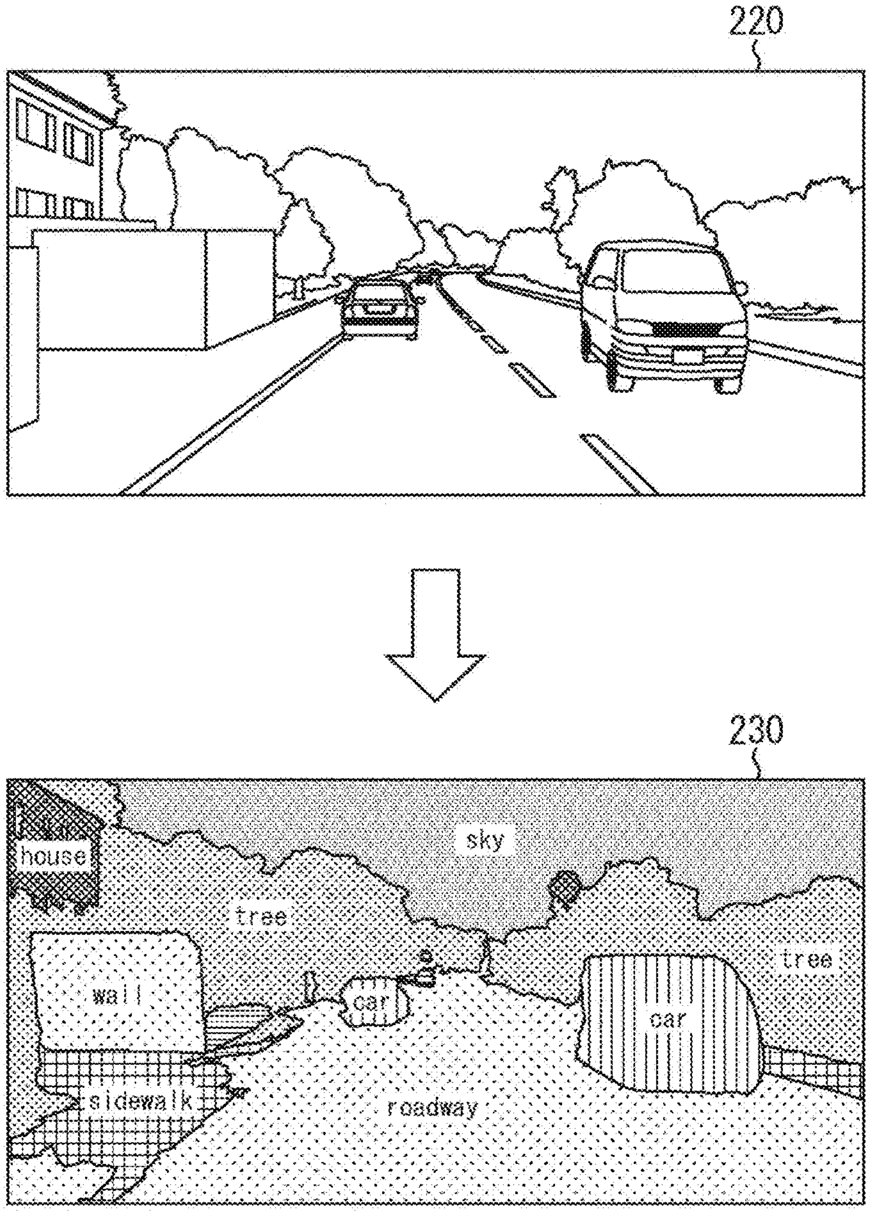
FIG. 12 is a diagram explaining semantic segmentation.

Furthermore, for example, it is assumed that a captured image 220 as illustrated in the upper part of FIG. 12 is captured by the sensor data acquisition unit 71 configured as a camera. The captured image 220 shows a scene of a road on which cars are traveling.

The external environment recognition unit 151 verifies the attribute of a subject on a pixel basis on the captured image 220 by semantic segmentation by machine learning such as deep learning and labels each pixel with the verified attribute. With this processing, a processed image 230 as illustrated in the lower part of FIG. 12 is obtained. In the processed image 230, a car, a roadway, a sidewalk, a house, a wall, a tree, sky, and the like are verified as the attributes of the subjects.

In this manner, the external environment recognition unit 151 acquires the external environment information by recognizing the state of the external environment.

Then, in step S35, the safety degree calculation unit 75 calculates the safety degree of the flat surface detected by a flat surface detection unit 72 on the basis of the flat surface map, the flat surface information, and the external environment information acquired by the external environment recognition unit 151.

For example, the safety degree calculation unit 75 calculates the safety degree of the flat surface depending on how much its flat surface information and the external environment information satisfy a preset condition. Examples of the preset condition include (1) the inclination of the flat surface with respect to the gravitational acceleration direction is 5° or smaller, (2) the size of the flat surface is 1 $m^2$ or larger, (3) the state of the flat surface is other than water or gravel, and additionally (4) there is no approaching object within a radius of 2 m.

For example, it is assumed that five flat surfaces A to E are detected by the flat surface detection unit 72.

As illustrated in FIG. 13, the flat surface A has an inclination of 1.2°, a size of 6.0 $m^2$, a flat surface state of concrete, and no approaching object. The flat surface B has an inclination of 5.0°, a size of 4.5 $m^2$, a flat surface state of gravel, and two trees as approaching objects. The flat surface C has an inclination of 12.0°, a size of 2.0 $m^2$, a flat surface state of turf, and no approaching object. The flat surface D has an inclination of 3.5°, a size of 0.9 $m^2$, a flat surface state of concrete, and two cars as approaching objects. The flat surface E has an inclination of 2.3°, a size of 3.7 $m^2$, a flat surface state of gravel, and three bicycles as approaching objects.

Here, among the above-described conditions (1) to (4), the flat surface A satisfies all four conditions, the flat surface B satisfies two conditions, the flat surface C satisfies three conditions, the flat surface D satisfies two conditions, and the flat surface E satisfies two conditions. Therefore, in this case, the safety degree of the flat surface A that satisfies all of the conditions (1) to (4) is calculated as the highest value.

Furthermore, the safety degree calculation unit 75 may calculate the safety degree of the flat surface on the basis of a success rate of a process necessary for the moving body 20 to stop on the flat surface. For example, the product of a stop stability rate calculated from the flat surface information (flatness) and a non-collision probability calculated from the external environment information is calculated as the safety degree of the flat surface. For example, the non-collision probability is higher in the sidewalk than in the roadway and higher in the turf in the park than in the sidewalk even if the flat surfaces have the same inclination and the same size. Furthermore, for example, in the indoor environment, the non-collision probability is higher on the top surface of the table that is not stepped on by a person than on the floor surface where people come and go.

In addition, the stop stability rate may be calculated on the basis of an experiment.

Figure 14:
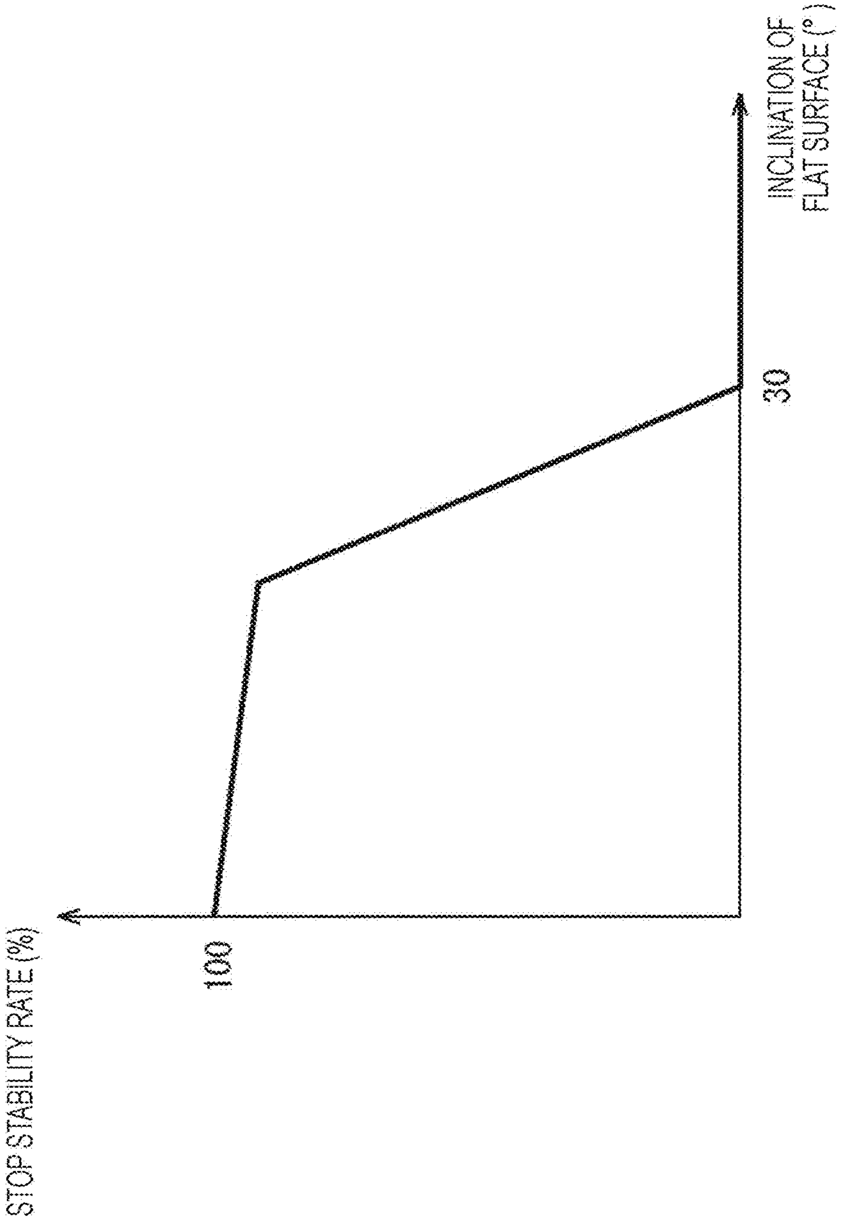
FIG. 14 is a diagram illustrating an example of a stop stability rate.

FIG. 14 illustrates an example of the stop stability rate calculated on the basis of an experiment. In the example in FIG. 14, the stop stability rate only decreases with a slight inclination from 100% when the inclination of the flat surface is from 0° to a certain angle, but when the inclination of the flat surface exceeds the certain angle, the stop stability rate decreases with a sudden inclination. When the inclination of the flat surface is 30° or larger, the stop stability rate is 0%, and the moving body 20 is no longer allowed to stop (land) safely.

Moreover, the product of the above-described stop stability rate and an in-region stop probability calculated from a control error of the airframe as the external environment information and the size of the flat surface may be calculated as a stop success rate indicating the safety degree of the flat surface.

For example, it is assumed that five flat surfaces A to E are detected by the flat surface detection unit 72.

As illustrated in FIG. 15, since the flat surface A has a stop stability rate of 99% and an in-region stop probability of 99%, the stop success rate of the flat surface A is given as 99%. Since the flat surface B has a stop stability rate of 98% and an in-region stop probability of 80%, the stop success rate of the flat surface B is given as 78.4%. Since the flat surface C has a stop stability rate of 90% and an in-region stop probability of 20%, the stop success rate of the flat surface C is given as 18%. Since the flat surface D has a stop stability rate of 99% and an in-region stop probability of 15%, the stop success rate of the flat surface D is given as 14.85%. Since the flat surface E has a stop stability rate of 99% and an in-region stop probability of 60%, the stop success rate of the flat surface B is given as 59.4%. Note that, in FIG. 15, the inclination and size of each of the flat surfaces A to E are similar to those in FIGS. 8 and 13.

As described above, in the example in FIG. 15, the stop success rate of the flat surface A is the highest, and the safety degree of the flat surface A is calculated as the highest value.

According to the above processing, since the movement to the flat surface is controlled on the basis of the safety degree of the flat surface calculated on the basis of the flat surface information and the external environment information, the moving body 20 is allowed to stop still more safely without stopping at a place that is not suited for making a stop and furthermore without colliding with an obstacle after the stop.

5. Display of Superimposed Image and Specification of Stop Location

Figure 16:
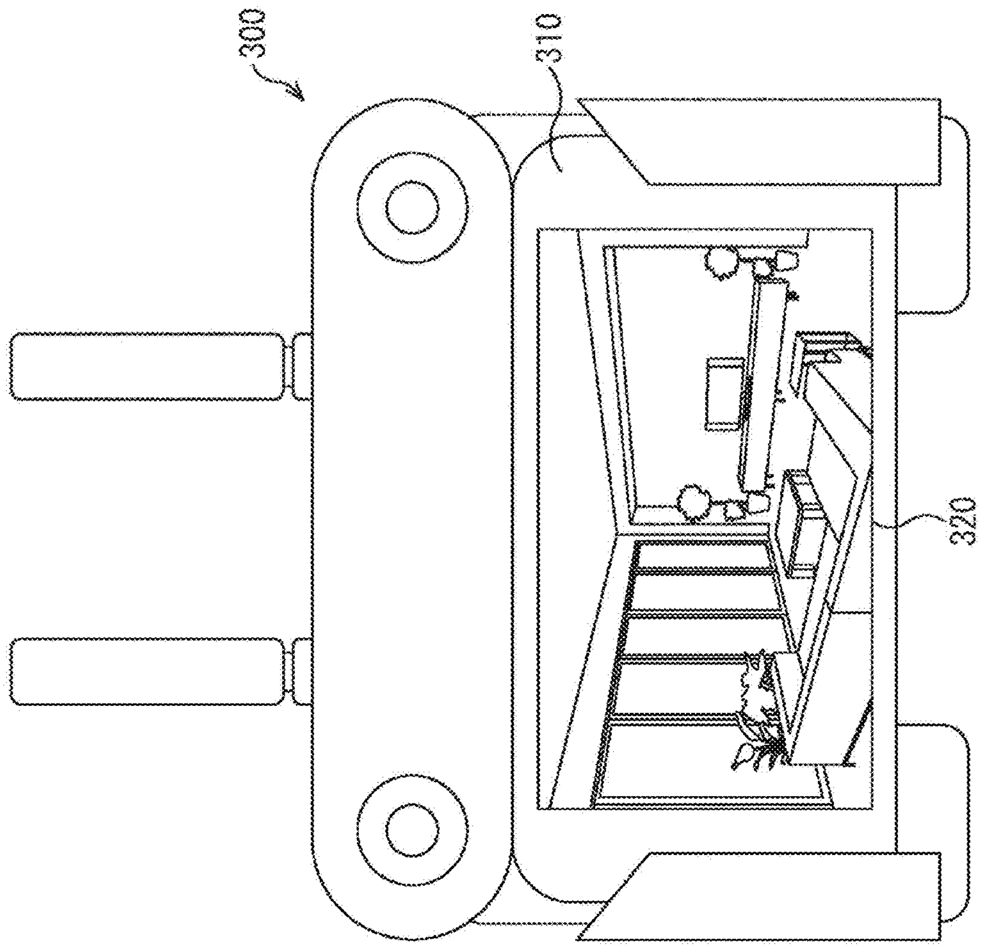
FIG. 16 is a diagram illustrating an exemplary configuration of a controller.

FIG. 16 is a diagram illustrating an exemplary configuration of a controller for piloting the moving body 20.

The controller 300 in FIG. 16 is configured such that a smartphone 310 is attachable to a dedicated transmitter. As described earlier, the moving body 20 may be configured to move in accordance with a signal from the controller 300, or may be configured to autonomously move.

In the controller 300 in FIG. 16, a captured image in which the external environment is being captured by the sensor 21 configured as a camera while the moving body 20 is moving is displayed on a screen 320 of the smartphone 310. The captured image may be a moving image or a still image.

In the example in FIG. 16, a captured image being captured while the moving body 20 configured as a drone is flying in a living room is displayed on the screen 320.

(Display of Superimposed Image)

A superimposed image generated by the image generation unit 77 on the basis of the calculated safety degree is displayed on the captured image displayed on the screen 320 at a position corresponding to each flat surface for which the safety degree has been calculated.

Figure 17:
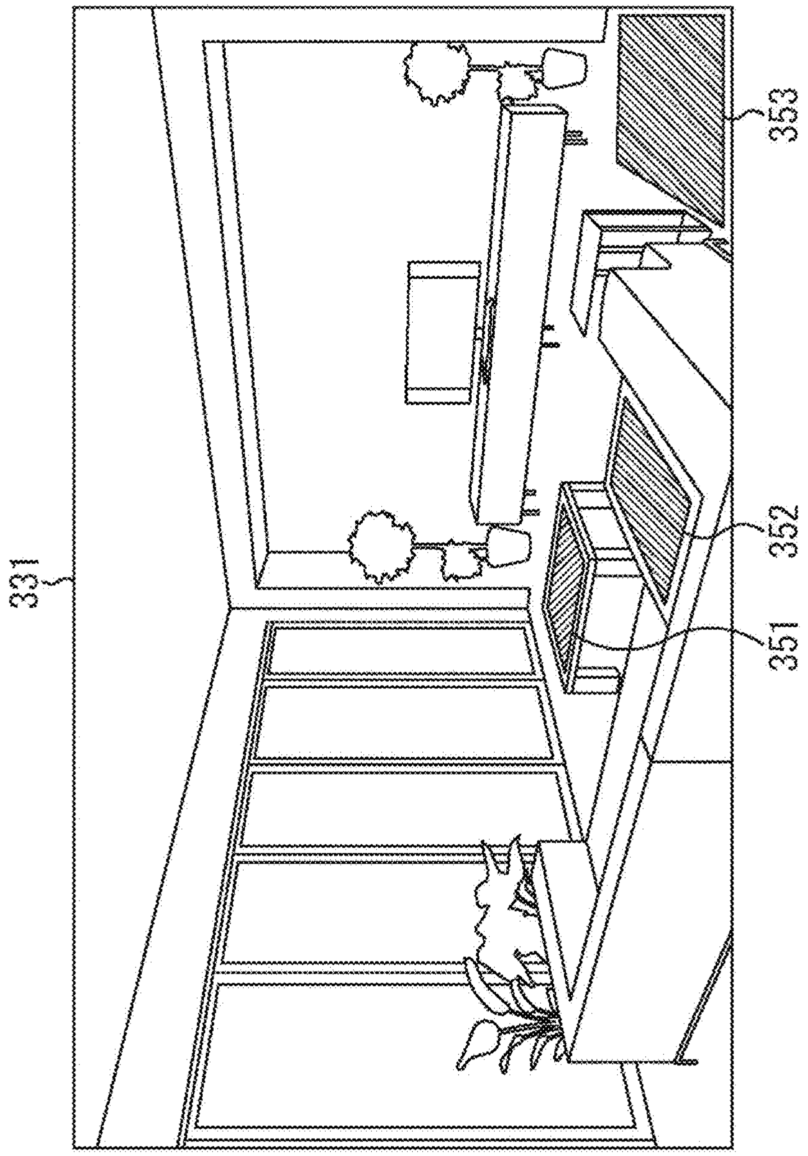
FIG. 17 is a diagram illustrating an example of superimposed images.

For example, superimposed images 351, 352, and 353 imitating flat surfaces are displayed on a captured image 331 illustrated in FIG. 17 at positions corresponding to flat surfaces for which the safety degrees having values larger than a predetermined value have been calculated. The superimposed image 351 is superimposed on the captured image 331 at a position corresponding to the top surface of the table, and the superimposed image 352 is superimposed on the captured image 331 at a position corresponding to the seat surface of the sofa. The superimposed image 353 is superimposed on the captured image 331 at a position corresponding to the floor surface of the living room.

The superimposed images 351, 352, and 353 may be displayed in colors according to the safety degrees of the corresponding flat surfaces, such as green in a case where the safety degree is high to a certain extent, yellow in a case where the safety degree is medium, or red in a case where the safety degree is lower than medium.

For example, the superimposed image 351 is displayed in green because a person does not step on the top surface of the table, the superimposed image 352 is displayed in yellow because a person is likely to sit on the seat surface of the sofa, and the superimposed image 352 is displayed in red because a person is highly likely to step on the floor surface of the living room.

In the example in FIG. 16, the superimposed image imitating a flat surface is assumed to be displayed on the captured image 331, but the display form of the superimposed image is not restricted to this example.

Figure 18:
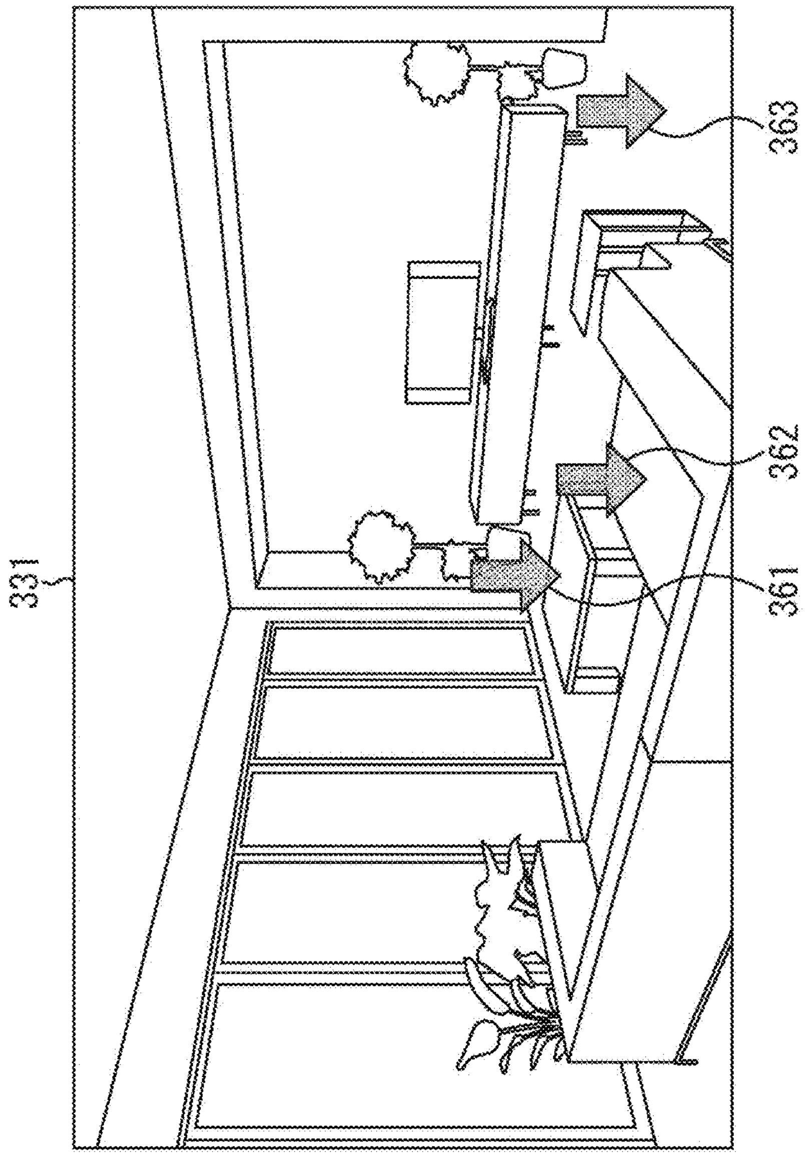
FIG. 18 is a diagram illustrating an example of superimposed images.

For example, arrow-shaped superimposed images 361, 362, and 363 may be displayed on the captured image 331 at positions corresponding to flat surfaces for which the safety degrees having values larger than a predetermined value have been calculated, as illustrated in FIG. 18.

Figure 19:
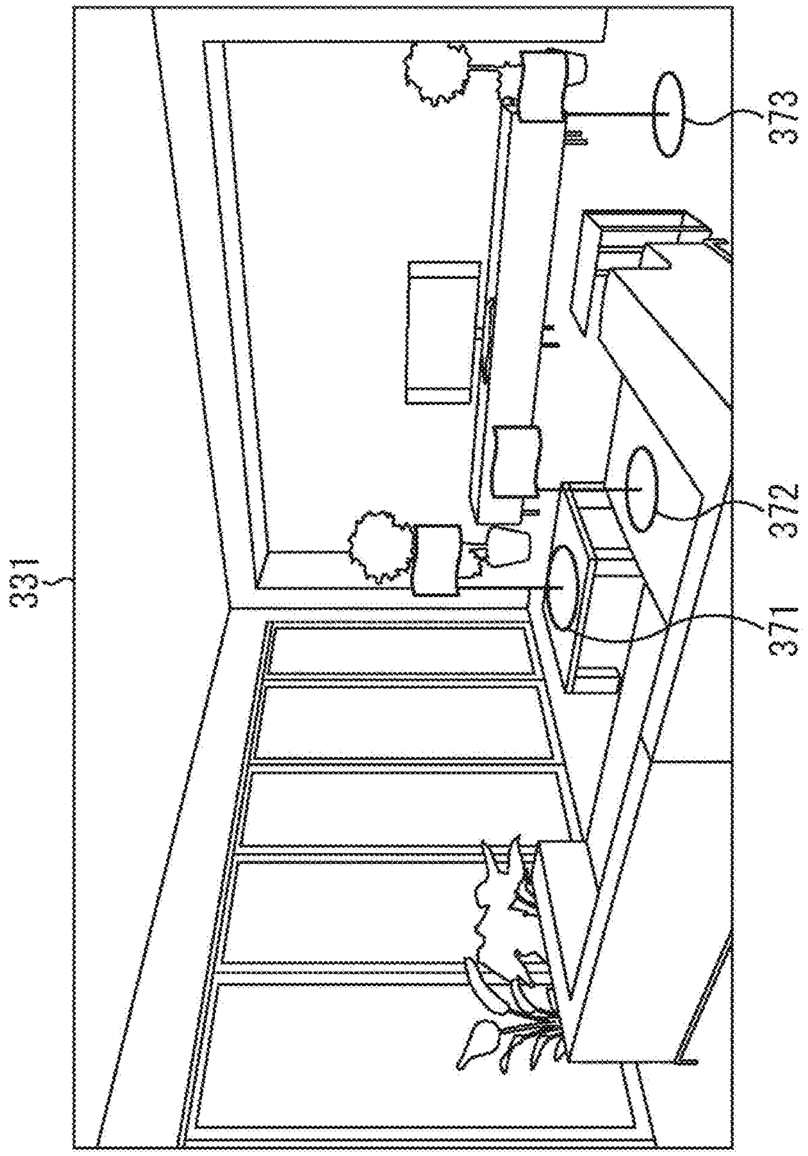
FIG. 19 is a diagram illustrating an example of superimposed images.

Moreover, superimposed images 371, 372, and 373 imitating flags may be displayed on the captured image 331 at positions corresponding to flat surfaces for which the safety degrees having values larger than a predetermined value have been calculated, as illustrated in FIG. 19.

Note that, in addition to being displayed in a color according to the safety degree of the corresponding flat surface, the above-described superimposed image may be displayed in a size according to the safety degree or may be displayed by blinking at a speed according to the safety degree.

(Specification of Stop Location)

In a case where the moving body 20 is configured to autonomously move, a flat surface corresponding to a superimposed image selected by a user on the captured image displayed on the screen 320 having a touch panel function may be specified as the stop location of the moving body 20.

For example, in a case where the superimposed image 351 is touched by the user on the captured image 331 in FIG. 17, the moving body 20 configured as a drone is controlled so as to land on the top surface of the table corresponding to the superimposed image 351.

Figure 20:
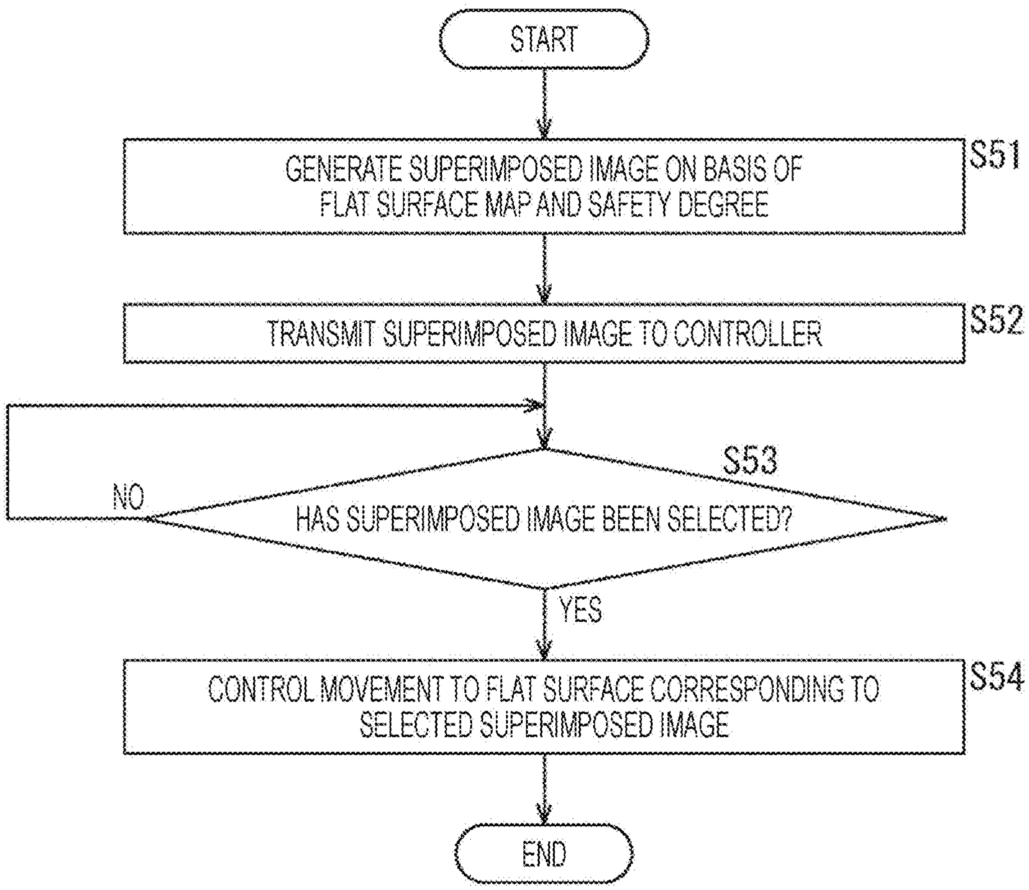
FIG. 20 is a flowchart explaining a flow of movement control processing using superimposed images.

Here, a flow of movement control processing for the moving body 20 using superimposed images will be described with reference to the flowchart in FIG. 20.

In step S51, the image generation unit 77 generates a superimposed image on the basis of the flat surface map generated by the map construction unit 74 and the safety degree calculated by the safety degree calculation unit 75.

In step S52, the communication unit 52 transmits the superimposed image generated by the image generation unit 77 to the controller 300 (smartphone 310).

Accordingly, the superimposed image is displayed on the captured image displayed on the screen 320 of the smartphone 310 at a position corresponding to a flat surface for which the safety degree having a value larger than a predetermined value has been calculated.

In such a state, when any one of the superimposed images is selected by the user in the captured image displayed on the screen 320 of the controller 300 (smartphone 310), the controller 300 transmits a signal indicating that the superimposed image has been selected, to the moving body 20.

In step S53, the movement control unit 76 determines whether or not the superimposed image has been selected by the user in the captured image displayed on the controller 300, on the basis of the signal from the controller 300.

The processing in step S53 is repeated until it is determined that the superimposed image has been selected, and the processing proceeds to step S54 when it is determined that the superimposed image has been selected.

In step S54, the movement control unit 76 controls the movement of the moving body 20 to the flat surface corresponding to the selected superimposed image.

At this time, the movement control unit 76 sets a stop target point of the own device in a flat surface region that is the movement destination.

For example, in a case where the flat surface region that is the movement destination is expressed by point cloud data, a point located at the center of gravity of the point cloud data is set as the stop target point.

Furthermore, a point present at a position farthest from an edge of the flat surface region that is the movement destination may be set as the stop target point.

Figure 21:
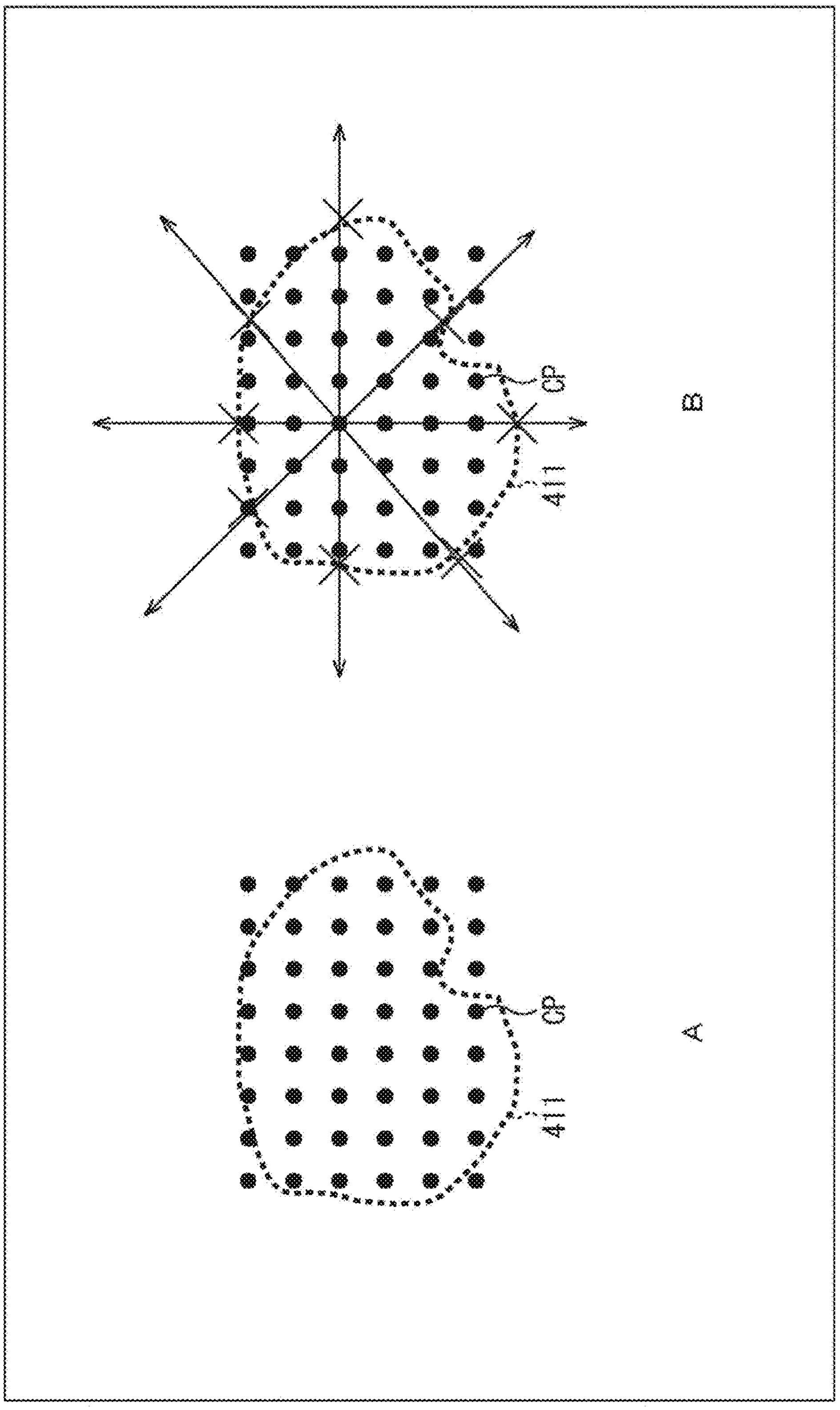
FIG. 21 is a diagram explaining setting of a stop target point.

For example, as illustrated in A of FIG. 21, the movement control unit 76 generates candidate points CP arranged at regular intervals in the entirety of a flat surface region 411. Then, as illustrated in B of FIG. 21, the movement control unit 76 calculates a distance from each of the generated candidate points CP to an edge of the flat surface region 411 toward each of directions at regular angular intervals (eight directions in the example in FIG. 21). The candidate point CP having the largest minimum value among the distances calculated in this manner is set as the stop target point.

Furthermore, in a case where the flat surface region that is the movement destination has a shape of a circle, an oblong rectangle, or the like, the center of gravity of these figures may be set as the stop target point.

According to the above processing, since the movement to a flat surface specified by the user from among flat surfaces having relatively high safety degrees is controlled, the moving body 20 is allowed to more safely stop at a place desired by the user.

A series of the above-described pieces of processing can be executed by hardware as well and also can be executed by software. In a case where the series of pieces of processing is executed by software, a program constituting this software is installed from a network or a program recording medium.

The embodiments of the technology according to the present disclosure are not limited to the above-described embodiments, and a variety of modifications can be made without departing from the scope of the technology according to the present disclosure.

Furthermore, the effects described in the present description merely serve as examples and not construed to be limited. There may be another effect.

Moreover, the technology according to the present disclosure can also be configured as described below.

(1)

A moving body including:

a safety degree calculation unit that calculates a safety degree of a flat surface existing in an external environment on the basis of flat surface information regarding the flat surface; and a movement control unit that controls movement to the flat surface on the basis of the calculated safety degree.

(2)

The moving body according to (1), in which the safety degree calculation unit calculates the safety degree on the basis of a flat surface map in which the flat surface information is mapped to coordinates of the flat surface in a three-dimensional space.

(3)

The moving body according to (2), in which the flat surface information includes a position, a size, and an inclination of the flat surface.

(4)

The moving body according to (3), in which the inclination is an inclination with respect to a gravitational acceleration direction.

(5)

The moving body according to (3) or (4), in which the flat surface information further includes a material of the flat surface.

(6)

The moving body according to any one of (3) to (5), in which the flat surface information further includes a degree of unevenness of the flat surface.

(7)

The moving body according to any one of (2) to (6), further including a map construction unit that constructs the flat surface map on the basis of position information on the own body and the flat surface information regarding the flat surface detected in the external environment using sensor data.

(8)

The moving body according to any one of (2) to (7), in which the safety degree calculation unit calculates the safety degree on the basis of the flat surface map and external environment information regarding the external environment.

(9)

The moving body according to (8), in which the external environment information includes information representing presence or absence of an obstacle in the external environment.

(10)

The moving body according to (9), in which the obstacle is a dynamic object.

(11)

The moving body according to any one of (8) to (10), in which the external environment information includes an attribute of the flat surface existing in the external environment.

(12)

The moving body according to (11), in which the attribute is verified by semantic segmentation.

(13)

The moving body according to any one of (8) to (12), further including an external environment recognition unit that acquires the external environment information by recognizing a state of the external environment on the basis of sensor data.

(14)

The moving body according to any one of (1) to (13), in which the movement control unit controls movement to the flat surface having the safety degree that is highest.

(15)

The moving body according to (14), in which the movement control unit feeds back a result of movement to the flat surface, as the flat surface information.

(16)

The moving body according to any one of (1) to (15), further including an image generation unit that generates a superimposed image to be superimposed on a captured image obtained by capturing the external environment at a position corresponding to the flat surface for which the safety degree has been calculated.

(17)

The moving body according to (16), in which the image generation unit generates the superimposed image to be displayed in a color according to the safety degree.

(18)

The moving body according to (16) or (17), in which the movement control unit controls movement to the flat surface corresponding to the superimposed image selected by a user on the captured image.

(19)

A control method performed by a moving body, the control method including:

calculating a safety degree of a flat surface existing in an external environment on the basis of flat surface information regarding the flat surface; and controlling movement to the flat surface on the basis of the calculated safety degree.

(20)

A program for causing a processor to execute processing including:

calculating a safety degree of a flat surface existing in an external environment on the basis of flat surface information regarding the flat surface; and controlling movement to the flat surface on the basis of the calculated safety degree.

REFERENCE SIGNS LIST

10 Moving body
20 Moving body
21 Sensor
51 Control unit
52 Communication unit
53 Storage unit
54 Movement mechanism
71 Sensor data acquisition unit
72 Flat surface detection unit
73 Self-position estimation unit
74 Map construction unit
75 Safety degree calculation unit
76 Movement control unit
77 Image generation unit
151 External environment recognition unit

The invention claimed is:

1. An unmanned aerial vehicle comprising:

a movement mechanism;

a transceiver;

a camera;

a sensor; and control circuitry configured to:

determine a position of the unmanned aerial vehicle in an external environment that comprises an enclosed three-dimensional space by simultaneous localization and mapping (SLAM) based on data from the sensor;

based on the data from the sensor, detect a plurality of planes on one or more static objects positioned on the ground in the enclosed three-dimensional space and within a predetermined distance from the determined position of the unmanned aerial vehicle;

construct a map of the plurality of planes in the enclosed three-dimensional space, wherein each of the plurality of planes in the map are located at different heights above the ground within the predetermined distance from the determined position of the unmanned aerial vehicle;

determine a safety degree of each of the plurality of planes sensed by the unmanned aerial vehicle based on corresponding plane information; and control movement of the unmanned aerial vehicle to a plane of the plurality of planes that has a highest determined safety degree, wherein the control circuitry is further configured to control the movement to the plane of the plurality of planes that has the highest determined safety degree by controlling the movement based on a superimposed image selected by a user on a captured image of the external environment, among a plurality of superimposed images that are superimposed on a position corresponding to the plane for which the safety degree was determined, wherein, for each of the plurality of planes, the plane information includes each of a position, a size, an inclination of the plane, a material of the plane, and a degree of unevenness of the plane, wherein the inclination of the plane is an inclination relative to a direction of gravitational acceleration of the unmanned aerial vehicle; and wherein the plane of the plurality of planes that has the highest determined safety degree is a plane that comprises:

a surface material that is one of a predetermined list of permitted surface materials, a surface inclination less than a predetermined surface inclination value, a degree of surface unevenness less than a predetermined surface unevenness value, a surface position within a predetermined distance from the position of the unmanned aerial vehicle, and a surface size equal to or greater than a predetermined surface size, and greater than a surface size of any other of the plurality of planes that comprises:

the surface material that is one of the predetermined list of permitted surface materials, the degree of surface unevenness less than the predetermined surface unevenness value, the surface inclination less than the predetermined surface inclination value, and the surface position within the predetermined distance from the position of the unmanned aerial vehicle.

2. The unmanned aerial vehicle according to claim 1, wherein, for each of the plurality of planes, the control circuitry determines the safety degree based on a plane map in which the plane information is mapped to coordinates of the plane in a three-dimensional space.

3. The unmanned aerial vehicle according to claim 2, wherein, for each of the plurality of planes, the control circuitry constructs the plane map based on the plane information regarding the plane detected by the unmanned aerial vehicle in the external environment using positional information and sensor data of the unmanned aerial vehicle.

4. The unmanned aerial vehicle according to claim 2, wherein, for each of the plurality of planes, the control circuitry determines the safety degree based on the plane map and external environment information regarding the external environment.

5. The unmanned aerial vehicle according to claim 4, wherein the external environment information includes information indicating a presence or absence of obstacles in the external environment.

6. The unmanned aerial vehicle according to claim 5, wherein the obstacles are dynamic objects.

7. The unmanned aerial vehicle according to claim 4, wherein, for each of the plurality of planes, the external environment information includes attributes of the plane existing in the external environment.

8. The unmanned aerial vehicle according to claim 7, wherein the attributes are determined by semantic segmentation.

9. The unmanned aerial vehicle according to claim 4, wherein the control circuitry acquires the external environment information by recognizing a state of the external environment based on sensor data of the unmanned aerial vehicle.

10. The unmanned aerial vehicle according to claim 1, wherein the control circuitry feeds back a movement result to the plane information regarding the plane of the plurality of planes that has the highest determined safety degree.

11. The unmanned aerial vehicle according to claim 1, wherein the control circuitry generates the superimposed image.

12. The unmanned aerial vehicle according to claim 11, wherein the control circuitry generates the superimposed image so as to be displayed in a color corresponding to the safety degree.

13. The unmanned aerial vehicle according to claim 1, wherein the safety degree of each of the plurality of planes comprises a stop success rate that is determined by multiplying a corresponding flat surface stop stability rate and a non-collision probability that is related to one or more objects detected in an external environment by the control circuitry.

14. A method for controlling an unmanned aerial vehicle by a control circuit, the method comprising:

determining a position of the unmanned aerial vehicle in an external environment that comprises an enclosed three-dimensional space by simultaneous localization and mapping (SLAM) based on data from the sensor;

based on the data from the sensor, detecting a plurality of planes on one or more static objects positioned on the ground in the enclosed three-dimensional space and within a predetermined distance from the determined position of the unmanned aerial vehicle;

constructing a map of the plurality of planes in the enclosed three-dimensional space, wherein each of the plurality of planes in the map are located at different heights above the ground within the predetermined distance from the determined position of the unmanned aerial vehicle;

determining a safety degree of each of the plurality of planes sensed by the unmanned aerial vehicle based on corresponding plane information; and controlling movement of the unmanned aerial vehicle to a plane of the plurality of planes that has a highest determined safety degree;

wherein the controlling the movement to the plane of the plurality of planes that has the highest determined safety degree comprises controlling the movement based on a superimposed image selected by a user on a captured image of the external environment, among a plurality of superimposed images that are superimposed on a position corresponding to the plane for which the safety degree was determined, wherein, for each of the plurality of planes, the plane information includes each of a position, a size, an inclination of the plane, a material of the plane, and a degree of unevenness of the plane, wherein the inclination of the plane is an inclination relative to a direction of gravitational acceleration of the unmanned aerial vehicle; and wherein the plane of the plurality of planes that has the highest determined safety degree is a plane that comprises:

a surface material that is one of a predetermined list of permitted surface materials, a surface inclination less than a predetermined surface inclination value, a degree of surface unevenness less than a predetermined surface unevenness value, a surface position within a predetermined distance from the position of the unmanned aerial vehicle, and a surface size equal to or greater than a predetermined surface size, and greater than a surface size of any other of the plurality of planes that comprises:

the surface material that is one of the predetermined list of permitted surface materials, the degree of surface unevenness less than the predetermined surface unevenness value, the surface inclination less than the predetermined surface inclination value, and the surface position within the predetermined distance from the position of the unmanned aerial vehicle.

15. A non transistory computer product containing instructions for causing a processor to execute the method of claim 14.

16. The method according to claim 14, wherein the safety degree of each of the plurality of planes comprises a stop success rate that is determined by multiplying a corresponding flat surface stop stability rate and a non-collision probability that is related to one or more objects detected in an external environment.

* * * * *